US012598136B2

(12) United States Patent
Previdi et al.

(10) Patent No.: US 12,598,136 B2
(45) Date of Patent: Apr. 7, 2026

(54) SEGMENT ROUTING: PCE DRIVEN DYNAMIC SETUP OF FORWARDING ADJACENCIES AND EXPLICIT PATH

(71) Applicant: Cisco Technology, Inc., San Jose, CA (US)

(72) Inventors: Stefano B. Previdi, Rome (IT); Clarence Filsfils, Brussels (BE)

(73) Assignee: CISCO TECHNOLOGY, INC., San Jose, CA (US)

(*) Notice: Subject to any disclaimer, the term of this patent is extended or adjusted under 35 U.S.C. 154(b) by 441 days.

(21) Appl. No.: 17/875,012

(22) Filed: Jul. 27, 2022

(65) Prior Publication Data

US 2022/0376987 A1    Nov. 24, 2022

Related U.S. Application Data

(63) Continuation of application No. 16/599,975, filed on Oct. 11, 2019, now Pat. No. 11,424,987, which is a (Continued)

(51) Int. Cl.
*H04L 45/50* (2022.01)
*H04L 12/46* (2006.01)
(Continued)

(52) U.S. Cl.
CPC .......... *H04L 45/50* (2013.01); *H04L 12/4633* (2013.01); *H04L 45/04* (2013.01); (Continued)

(58) Field of Classification Search
None
See application file for complete search history.

(56) References Cited

U.S. PATENT DOCUMENTS 4,853,843 A    8/1989   Ecklund
5,448,718 A    9/1995   Cohn et al.
(Continued)

FOREIGN PATENT DOCUMENTS

CN    1726679 A    1/2006
CN    101247253 A   8/2008
(Continued)

OTHER PUBLICATIONS

Aggarwal R., et al., "MPLS Upstream Label Assignment and Context Specific Label Space," draft-raggarwa-mpls-upstream-label-00.txt, Network Working Group, Internet Draft, Jan. 2005, pp. 1-8, http://tools.ietf.org/html/draft-raggarwa-mpls-upstream-label-00.
(Continued)

*Primary Examiner* — Gregory B Sefcheck
*Assistant Examiner* — Benjamin Peter Welte

(57) ABSTRACT

An apparatus and method for path creation element driven dynamic setup of forwarding adjacencies and explicit path. In one embodiment of the method, a node receives an instruction to create a tunnel between the node and another node. The node creates or initiates the creation of the tunnel in response to receiving the instruction, wherein the tunnel comprises a plurality of nodes in data communication between the node and the other node. The node maps a first identifier (ID) to information relating to the tunnel. The node advertises the first ID to other nodes in a network of nodes.

14 Claims, 8 Drawing Sheets

Related U.S. Application Data continuation of application No. 15/394,169, filed on Dec. 29, 2016, now Pat. No. 10,469,325, which is a continuation of application No. 14/211,101, filed on Mar. 14, 2014, now Pat. No. 9,571,349.

(60) Provisional application No. 61/791,242, filed on Mar. 15, 2013.

(51) Int. Cl.

| | |
|---|---|
| *H04L 45/00* | (2022.01) |
| *H04L 45/02* | (2022.01) |
| *H04L 45/12* | (2022.01) |
| *H04L 45/74* | (2022.01) |
| *H04L 45/7452* | (2022.01) |
| *H04L 47/724* | (2022.01) |
| *H04L 49/60* | (2022.01) |

(52) U.S. Cl.
CPC .............. *H04L 45/12* (2013.01); *H04L 45/46* (2013.01); *H04L 45/507* (2013.01); *H04L 45/54* (2013.01); *H04L 45/74* (2013.01); *H04L 45/7452* (2022.05); *H04L 47/724* (2013.01); *H04L 49/608* (2013.01)

(56) References Cited

U.S. PATENT DOCUMENTS

| | | | |
|---|---|---|---|
| 5,654,695 | A | 8/1997 | Olnowich et al. |
| 5,699,521 | A | 12/1997 | Iizuka et al. |
| 5,764,624 | A | 6/1998 | Endo et al. |
| 6,032,197 | A | 2/2000 | Birdwell et al. |
| 6,147,976 | A | 11/2000 | Shand et al. |
| 6,374,303 | B1 | 4/2002 | Armitage et al. |
| 6,577,600 | B1 | 6/2003 | Bare |
| 6,647,428 | B1 | 11/2003 | Bannai et al. |
| 6,882,627 | B2 | 4/2005 | Pieda et al. |
| 6,904,462 | B1 | 6/2005 | Sinha |
| 6,963,570 | B1 | 11/2005 | Agarwal |
| 7,023,846 | B1 | 4/2006 | Andersson et al. |
| 7,031,253 | B1 | 4/2006 | Katukam et al. |
| 7,031,607 | B1 | 4/2006 | Aswood Smith |
| 7,035,209 | B2 | 4/2006 | Dang et al. |
| 7,061,921 | B1 | 6/2006 | Sheth |
| 7,068,654 | B1 | 6/2006 | Joseph et al. |
| 7,072,346 | B2 | 7/2006 | Hama |
| 7,088,721 | B1 | 8/2006 | Droz et al. |
| 7,099,286 | B1 | 8/2006 | Swallow |
| 7,154,416 | B1 | 12/2006 | Savage |
| 7,174,387 | B1 | 2/2007 | Shand et al. |
| 7,180,887 | B1 | 2/2007 | Schwaderer et al. |
| 7,209,975 | B1 | 4/2007 | Zang et al. |
| 7,260,097 | B2 | 8/2007 | Casey |
| 7,286,479 | B2 | 10/2007 | Bragg |
| 7,330,440 | B1 | 2/2008 | Bryant et al. |
| 7,359,377 | B1 | 4/2008 | Kompella et al. |
| 7,373,401 | B1 | 5/2008 | Azad |
| 7,420,992 | B1 | 9/2008 | Fang et al. |
| 7,430,210 | B2 | 9/2008 | Havala et al. |
| 7,457,237 | B2 | 11/2008 | Zetterlund et al. |
| 7,462,639 | B2 | 12/2008 | Georges et al. |
| 7,463,639 | B1 | 12/2008 | Rekhter |
| 7,466,661 | B1 | 12/2008 | Previdi et al. |
| 7,471,669 | B1 | 12/2008 | Sabesan et al. |
| 7,489,866 | B2 | 2/2009 | Ozugur et al. |
| 7,551,550 | B2 | 6/2009 | Sinha |
| 7,564,803 | B1 | 7/2009 | Minei et al. |
| 7,568,047 | B1 | 7/2009 | Aysan et al. |
| 7,577,143 | B1 | 8/2009 | Kompella |
| 7,593,340 | B2 | 9/2009 | Li et al. |
| 7,602,778 | B2 | 10/2009 | Guichard et al. |
| 7,610,330 | B1 | 10/2009 | Quinn et al. |
| 7,627,243 | B2 | 12/2009 | Sadananda |
| 7,697,455 | B2 | 4/2010 | Sadanada |
| 7,773,630 | B2 | 8/2010 | Huang et al. |
| 7,817,667 | B2 | 10/2010 | Frederiksen et al. |
| 7,885,179 | B1 | 2/2011 | Bryant et al. |
| 7,885,259 | B2 | 2/2011 | Filsfils |
| 7,885,294 | B2 | 2/2011 | Patel et al. |
| 7,894,352 | B2 | 2/2011 | Kompella et al. |
| 7,894,458 | B2 | 2/2011 | Jiang et al. |
| 7,903,554 | B1 | 3/2011 | Manur et al. |
| 7,940,695 | B1 | 5/2011 | Bahadur et al. |
| 7,970,929 | B1 | 6/2011 | Mahalingaiah |
| 7,983,174 | B1 | 7/2011 | Monaghan et al. |
| 8,064,441 | B2 | 11/2011 | Wijnands et al. |
| 8,121,126 | B1 | 2/2012 | Moisand et al. |
| 8,131,126 | B2 | 3/2012 | Kowalczyk et al. |
| 8,259,564 | B1 * | 9/2012 | Gredler ................ H04L 45/507 |
| 8,339,973 | B1 | 12/2012 | Pichumani et al. |
| 8,345,682 | B2 | 1/2013 | Pignataro et al. |
| 8,422,514 | B1 | 4/2013 | Kothari et al. |
| 8,542,706 | B2 | 9/2013 | Wang et al. |
| 8,542,709 | B2 | 9/2013 | Kim et al. |
| 8,611,335 | B1 | 12/2013 | Wu et al. |
| 8,619,817 | B1 | 12/2013 | Everson et al. |
| 8,630,167 | B2 | 1/2014 | Ashwood Smith |
| 8,630,176 | B2 | 1/2014 | Shaheen et al. |
| 8,711,883 | B2 | 4/2014 | Kang et al. |
| 8,743,679 | B2 | 6/2014 | Gerstel et al. |
| 8,792,384 | B2 | 7/2014 | Banerjee et al. |
| 8,848,728 | B1 | 9/2014 | Revah et al. |
| 8,923,292 | B2 | 12/2014 | Friskney et al. |
| 8,953,590 | B1 | 2/2015 | Aggarwal et al. |
| 9,036,474 | B2 | 5/2015 | Dibirdi et al. |
| 9,049,233 | B2 | 6/2015 | Frost et al. |
| 9,094,337 | B2 | 7/2015 | Bragg et al. |
| 9,112,734 | B2 | 8/2015 | Edwards et al. |
| 9,118,572 | B2 | 8/2015 | Sajassi et al. |
| 9,246,801 | B1 * | 1/2016 | Kompella .............. H04L 45/50 |
| 9,246,838 | B1 * | 1/2016 | Shen ...................... H04L 45/02 |
| 9,288,110 | B2 | 3/2016 | Liu |
| 9,319,312 | B2 | 4/2016 | Filsfils et al. |
| 9,485,150 | B2 | 11/2016 | Filsfils et al. |
| 9,571,349 | B2 | 2/2017 | Previdi et al. |
| 9,596,169 | B2 | 3/2017 | Choudhury et al. |
| 9,660,897 | B1 | 5/2017 | Gredler |
| 9,667,550 | B2 | 5/2017 | Gredler et al. |
| 9,749,227 | B2 | 8/2017 | Frost et al. |
| 9,794,148 | B1 | 10/2017 | Ramachandran et al. |
| 9,923,798 | B1 | 3/2018 | Bahadur et al. |
| 10,367,737 | B1 * | 7/2019 | Morris ................... H04L 45/04 |
| 10,469,325 | B2 | 11/2019 | Previdi et al. |
| 10,652,134 | B1 * | 5/2020 | Morris ................. H04L 45/566 |
| 10,805,204 | B1 | 10/2020 | Morris |
| 10,880,203 | B2 | 12/2020 | Nainar et al. |
| 11,290,340 | B2 | 3/2022 | Bashandy et al. |
| 11,323,356 | B2 | 5/2022 | Psenak et al. |
| 11,336,574 | B2 | 5/2022 | Previdi et al. |
| 2001/0037401 | A1 | 11/2001 | Soumiya et al. |
| 2001/0055311 | A1 | 12/2001 | Trachewsky et al. |
| 2002/0009050 | A1 * | 1/2002 | Ueno ...................... H04L 45/50 |
| | | | 370/389 |
| 2002/0059432 | A1 | 5/2002 | Masuda et al. |
| 2002/0103732 | A1 | 8/2002 | Bundy et al. |
| 2002/0131424 | A1 | 9/2002 | Suemura |
| 2002/0191545 | A1 | 12/2002 | Pieda et al. |
| 2003/0016678 | A1 | 1/2003 | Maeno |
| 2003/0026271 | A1 | 2/2003 | Erb et al. |
| 2003/0043747 | A1 | 3/2003 | Edwin et al. |
| 2003/0043798 | A1 | 3/2003 | Pugel |
| 2003/0126272 | A1 | 7/2003 | Corl, Jr. et al. |
| 2003/0131130 | A1 | 7/2003 | Malkosh |
| 2003/0133412 | A1 | 7/2003 | Iyer et al. |
| 2003/0142674 | A1 | 7/2003 | Casey |
| 2003/0142685 | A1 | 7/2003 | Bare |
| 2003/0147352 | A1 | 8/2003 | Ishibashi et al. |
| 2003/0154110 | A1 | 8/2003 | Walter et al. |
| 2003/0174644 | A1 | 9/2003 | Yagyu |
| 2003/0231634 | A1 | 12/2003 | Henderson et al. |
| 2004/0160958 | A1 | 8/2004 | Oh |
| 2004/0165537 | A1 | 8/2004 | Lee et al. |
| 2004/0174879 | A1 | 9/2004 | Basso et al. |

(56) References Cited

U.S. PATENT DOCUMENTS

| | | |
|---|---|---|
| 2004/0190527 A1 | 9/2004 | Okura et al. |
| 2004/0196840 A1 | 10/2004 | Amrutur et al. |
| 2004/0202158 A1 | 10/2004 | Takeno et al. |
| 2004/0202171 A1 | 10/2004 | Hama |
| 2004/0205237 A1 | 10/2004 | Doshi et al. |
| 2004/0205239 A1 | 10/2004 | Doshi et al. |
| 2004/0218612 A1 | 11/2004 | Zetterlund et al. |
| 2004/0218923 A1 | 11/2004 | Ozugur et al. |
| 2004/0240442 A1 | 12/2004 | Grimminger et al. |
| 2005/0021803 A1 | 1/2005 | Wren, III |
| 2005/0073958 A1 | 4/2005 | Atlas et al. |
| 2005/0088965 A1 | 4/2005 | Atlas et al. |
| 2005/0094630 A1* | 5/2005 | Valdevit ................. H04L 45/12 |
| 2005/0105515 A1 | 5/2005 | Reed et al. |
| 2005/0157724 A1 | 7/2005 | Montuno et al. |
| 2005/0198304 A1 | 9/2005 | Oliver et al. |
| 2005/0213513 A1 | 9/2005 | Ngo et al. |
| 2005/0259655 A1 | 11/2005 | Cuervo et al. |
| 2005/0286411 A1 | 12/2005 | Alicherry et al. |
| 2006/0002304 A1 | 1/2006 | Ashwood-Smith |
| 2006/0004916 A1 | 1/2006 | Caviglia et al. |
| 2006/0013209 A1 | 1/2006 | Somasundaram |
| 2006/0056397 A1 | 3/2006 | Aizu et al. |
| 2006/0075134 A1 | 4/2006 | Aalto et al. |
| 2006/0080421 A1 | 4/2006 | Hu |
| 2006/0092940 A1 | 5/2006 | Ansari et al. |
| 2006/0114818 A1 | 6/2006 | Canali et al. |
| 2006/0126272 A1 | 6/2006 | Horio et al. |
| 2006/0140111 A1 | 6/2006 | Vasseur et al. |
| 2006/0140190 A1 | 6/2006 | Lee |
| 2006/0146696 A1 | 7/2006 | Li et al. |
| 2006/0187817 A1 | 8/2006 | Charzinski et al. |
| 2006/0262735 A1 | 11/2006 | Guichard et al. |
| 2006/0274716 A1 | 12/2006 | Oswal et al. |
| 2007/0019647 A1 | 1/2007 | Roy et al. |
| 2007/0041345 A1 | 2/2007 | Yarvis et al. |
| 2007/0053342 A1 | 3/2007 | Sierecki et al. |
| 2007/0058607 A1 | 3/2007 | Mack-Crane et al. |
| 2007/0058638 A1 | 3/2007 | Guichard et al. |
| 2007/0189291 A1 | 8/2007 | Tian |
| 2007/0245034 A1 | 10/2007 | Retana et al. |
| 2008/0002664 A1 | 1/2008 | Li et al. |
| 2008/0002699 A1 | 1/2008 | Rajsic |
| 2008/0010227 A1 | 1/2008 | Matichuk |
| 2008/0049610 A1 | 2/2008 | Linwong et al. |
| 2008/0075016 A1 | 3/2008 | Ashwood-Smith |
| 2008/0075117 A1 | 3/2008 | Tanaka |
| 2008/0084881 A1 | 4/2008 | Dharwadkar et al. |
| 2008/0101227 A1 | 5/2008 | Fujita et al. |
| 2008/0101239 A1 | 5/2008 | Goode |
| 2008/0172497 A1 | 7/2008 | Mohan et al. |
| 2008/0189393 A1 | 8/2008 | Wagner |
| 2008/0192762 A1 | 8/2008 | Kompella et al. |
| 2008/0212465 A1 | 9/2008 | Yan |
| 2008/0225864 A1 | 9/2008 | Aissaoui et al. |
| 2008/0253367 A1 | 10/2008 | Ould-Brahim |
| 2008/0259820 A1 | 10/2008 | White et al. |
| 2008/0316916 A1 | 12/2008 | Tazzari et al. |
| 2009/0003349 A1 | 1/2009 | Havemann et al. |
| 2009/0003364 A1 | 1/2009 | Fendick et al. |
| 2009/0041038 A1 | 2/2009 | Martini et al. |
| 2009/0049194 A1 | 2/2009 | Csaszar et al. |
| 2009/0067348 A1 | 3/2009 | Vasseur et al. |
| 2009/0067445 A1 | 3/2009 | Diguet et al. |
| 2009/0080431 A1 | 3/2009 | Rekhter |
| 2009/0086644 A1 | 4/2009 | Kompella et al. |
| 2009/0103442 A1 | 4/2009 | Douville |
| 2009/0135815 A1* | 5/2009 | Pacella ................... H04L 45/04 |
| | | 370/389 |
| 2009/0141721 A1 | 6/2009 | Filsfils |
| 2009/0196289 A1 | 8/2009 | Shankar et al. |
| 2009/0217318 A1 | 8/2009 | Versteeg et al. |
| 2009/0247157 A1 | 10/2009 | Yoon et al. |
| 2009/0296710 A1 | 12/2009 | Agrawal et al. |
| 2010/0061720 A1 | 3/2010 | Fiaschi |
| 2010/0063983 A1 | 3/2010 | Groarke et al. |
| 2010/0088717 A1 | 4/2010 | Candelore et al. |
| 2010/0124231 A1 | 5/2010 | Kompella |
| 2010/0142548 A1 | 6/2010 | Sheth |
| 2010/0220739 A1 | 9/2010 | Ishiguro |
| 2010/0232435 A1 | 9/2010 | Jabr et al. |
| 2010/0272110 A1 | 10/2010 | Allan et al. |
| 2010/0284309 A1 | 11/2010 | Allan et al. |
| 2010/0302935 A1 | 12/2010 | Zhang et al. |
| 2010/0329153 A1 | 12/2010 | Xu |
| 2011/0013557 A1* | 1/2011 | Westberg ................ H04L 45/04 |
| 2011/0021193 A1 | 1/2011 | Hong |
| 2011/0060844 A1 | 3/2011 | Allan et al. |
| 2011/0063986 A1 | 3/2011 | Denecheau et al. |
| 2011/0080827 A1 | 4/2011 | Zetterlund et al. |
| 2011/0087784 A1 | 4/2011 | Liu |
| 2011/0090913 A1 | 4/2011 | Kim et al. |
| 2011/0149973 A1 | 6/2011 | Esteve Rothenberg et al. |
| 2011/0228780 A1 | 9/2011 | Ashwood-Smith et al. |
| 2011/0261722 A1 | 10/2011 | Awano |
| 2011/0268114 A1 | 11/2011 | Wijnands et al. |
| 2011/0273980 A1 | 11/2011 | Ashwood Smith |
| 2011/0280123 A1 | 11/2011 | Wijnands et al. |
| 2011/0280580 A1 | 11/2011 | Wexler |
| 2011/0286452 A1 | 11/2011 | Balus et al. |
| 2012/0014690 A1 | 1/2012 | Gruber et al. |
| 2012/0044936 A1* | 2/2012 | Bellagamba ............ H04L 45/50 |
| | | 370/392 |
| 2012/0044944 A1 | 2/2012 | Kotha et al. |
| 2012/0063526 A1 | 3/2012 | Xiao et al. |
| 2012/0069740 A1 | 3/2012 | Lu et al. |
| 2012/0069845 A1 | 3/2012 | Carney et al. |
| 2012/0075988 A1 | 3/2012 | Lu et al. |
| 2012/0082034 A1 | 4/2012 | Vasseur |
| 2012/0099861 A1 | 4/2012 | Zheng |
| 2012/0106560 A1 | 5/2012 | Gumaste |
| 2012/0120808 A1 | 5/2012 | Nandagopal et al. |
| 2012/0140679 A1 | 6/2012 | Inaba et al. |
| 2012/0170461 A1 | 7/2012 | Long |
| 2012/0179796 A1 | 7/2012 | Nagaraj et al. |
| 2012/0185229 A1 | 7/2012 | Perrett |
| 2012/0213225 A1 | 8/2012 | Subramanian et al. |
| 2012/0218884 A1 | 8/2012 | Kini et al. |
| 2012/0224506 A1 | 9/2012 | Gredler et al. |
| 2012/0236860 A1 | 9/2012 | Kompella et al. |
| 2012/0243539 A1 | 9/2012 | Keesara |
| 2012/0287818 A1 | 11/2012 | Corti et al. |
| 2012/0307629 A1 | 12/2012 | Vasseur et al. |
| 2012/0307644 A1 | 12/2012 | Gandhi et al. |
| 2013/0003728 A1 | 1/2013 | Kwong et al. |
| 2013/0051237 A1 | 2/2013 | Ong |
| 2013/0077476 A1 | 3/2013 | Enyedi et al. |
| 2013/0077624 A1 | 3/2013 | Keesara et al. |
| 2013/0077625 A1 | 3/2013 | Khera et al. |
| 2013/0077626 A1 | 3/2013 | Keesara et al. |
| 2013/0114402 A1 | 5/2013 | Ould-Brahim et al. |
| 2013/0114619 A1* | 5/2013 | Wakumoto ............ H04L 49/309 |
| | | 370/406 |
| 2013/0142052 A1 | 6/2013 | Burbidge et al. |
| 2013/0188634 A1 | 7/2013 | Magee |
| 2013/0219034 A1 | 8/2013 | Wang et al. |
| 2013/0258842 A1 | 10/2013 | Mizutani |
| 2013/0266012 A1 | 10/2013 | Dutta et al. |
| 2013/0266013 A1 | 10/2013 | Dutta et al. |
| 2013/0308948 A1 | 11/2013 | Swinkels et al. |
| 2013/0322449 A1 | 12/2013 | Hwang et al. |
| 2013/0343204 A1 | 12/2013 | Geib et al. |
| 2014/0010074 A1 | 1/2014 | Ye |
| 2014/0044036 A1 | 2/2014 | Kim et al. |
| 2014/0098675 A1 | 4/2014 | Frost et al. |
| 2014/0112124 A1* | 4/2014 | Sivabalan ............... H04L 45/50 |
| 2014/0160925 A1 | 6/2014 | Xu et al. |
| 2014/0169370 A1 | 6/2014 | Filsfils et al. |
| 2014/0177638 A1 | 6/2014 | Bragg et al. |
| 2014/0189156 A1 | 7/2014 | Morris |
| 2014/0192677 A1 | 7/2014 | Chew et al. |
| 2014/0254596 A1 | 9/2014 | Filsfils et al. |
| 2014/0269266 A1 | 9/2014 | Filsfils et al. |
| 2014/0269421 A1 | 9/2014 | Previdi et al. |

(56)                References Cited

U.S. PATENT DOCUMENTS

| | | | |
|---|---|---|---|
| 2014/0269422 A1 | 9/2014 | Filsfils et al. |
| 2014/0269698 A1 | 9/2014 | Filsfils et al. |
| 2014/0269699 A1 | 9/2014 | Filsfils et al. |
| 2014/0269721 A1 | 9/2014 | Bashandy et al. |
| 2014/0269725 A1 | 9/2014 | Filsfils et al. |
| 2014/0269727 A1 | 9/2014 | Filsfils et al. |
| 2014/0286195 A1 | 9/2014 | Fedyk |
| 2014/0317259 A1 | 10/2014 | Previdi et al. |
| 2014/0341222 A1 | 11/2014 | Filsfils et al. |
| 2014/0369356 A1 | 12/2014 | Bryant et al. |
| 2015/0023328 A1 | 1/2015 | Thubert et al. |
| 2015/0030020 A1 | 1/2015 | Kini et al. |
| 2015/0109902 A1 | 4/2015 | Kumar et al. |
| 2015/0249587 A1 | 9/2015 | Kozat et al. |
| 2015/0256456 A1 | 9/2015 | Previdi et al. |
| 2015/0263940 A1 | 9/2015 | Kini et al. |
| 2015/0319086 A1 | 11/2015 | Tripathi et al. |
| 2015/0326675 A1 | 11/2015 | Kini et al. |
| 2015/0334006 A1 | 11/2015 | Shao |
| 2015/0381406 A1 | 12/2015 | Francois et al. |
| 2016/0006614 A1 | 1/2016 | Zhao |
| 2016/0021000 A1 | 1/2016 | Previdi et al. |
| 2016/0034209 A1 | 2/2016 | Nanduri et al. |
| 2016/0034370 A1 | 2/2016 | Nanduri et al. |
| 2016/0119159 A1 | 4/2016 | Zhao et al. |
| 2016/0119229 A1 | 4/2016 | Zhou |
| 2016/0127142 A1 | 5/2016 | Tian et al. |
| 2016/0173366 A1 | 6/2016 | Saad et al. |
| 2016/0191372 A1 | 6/2016 | Zhang et al. |
| 2016/0254987 A1 | 9/2016 | Eckert et al. |
| 2016/0254988 A1 | 9/2016 | Eckert et al. |
| 2016/0254991 A1 | 9/2016 | Eckert et al. |
| 2016/0352654 A1 | 12/2016 | Filsfils et al. |
| 2017/0019330 A1 | 1/2017 | Filsfils et al. |
| 2017/0104673 A1 | 4/2017 | Bashandy et al. |
| 2017/0111277 A1 | 4/2017 | Previdi et al. |
| 2017/0302561 A1 | 10/2017 | Filsfils et al. |
| 2017/0302571 A1 | 10/2017 | Frost et al. |
| 2017/0346718 A1 | 11/2017 | Psenak et al. |
| 2017/0346737 A1 | 11/2017 | Previdi et al. |
| 2017/0366453 A1 | 12/2017 | Previdi et al. |
| 2018/0034730 A1 | 2/2018 | Zhao et al. |
| 2018/0077051 A1 | 3/2018 | Nainar et al. |
| 2018/0083871 A1 | 3/2018 | Filsfils et al. |
| 2018/0131532 A1 | 5/2018 | Wijnands et al. |
| 2018/0198706 A1 | 7/2018 | Ceccarelli et al. |
| 2018/0324090 A1 | 11/2018 | Duncan et al. |
| 2019/0097925 A1 | 3/2019 | Previdi et al. |
| 2019/0222483 A1 | 7/2019 | Bashandy et al. |
| 2019/0312806 A1 | 10/2019 | Psenak et al. |
| 2019/0349303 A1 | 11/2019 | Previdi et al. |

FOREIGN PATENT DOCUMENTS

| | | | |
|---|---|---|---|
| CN | 101399688 A | 4/2009 |
| CN | 101496357 A | 7/2009 |
| CN | 101616466 A | 12/2009 |
| CN | 101803293 A | 8/2010 |
| CN | 101841442 A | 9/2010 |
| CN | 101931548 A | 12/2010 |
| CN | 102098222 A | 6/2011 |
| CN | 102132533 A | 7/2011 |
| CN | 102299852 A | 12/2011 |
| CN | 102498694 A | 6/2012 |
| CN | 102714625 A | 10/2012 |
| WO | 2008021195 A1 | 2/2008 |
| WO | 2011032430 A1 | 3/2011 |
| WO | 2014188638 A1 | 11/2014 |
| WO | 2016095710 A1 | 6/2016 |

OTHER PUBLICATIONS

Bashandy A.R., et al., "Segment Router Over Label Distribution Protocol," U.S. Appl. No. 16/997,129, filed Aug. 19, 2020, Consisting of Specification, Claims, Abstract, and Drawings, 38 Pages.

Eckert T., et al., "Traffic Engineering for Bit Indexed Explicit Replication," U.S. Appl. No. 14/826,915, filed Sep. 23, 2015, Consisting of Specification, Claims, and Abstract (75 pages), and Drawings (18 sheets), 93 Pages.

Office Action in European Application No. 14721122, mailed Mar. 12, 2018, 6 pages.

Psenak P., et al., "Enforcing Strict Shortest Path Forwarding Using Strict Segment Identifier," U.S. Appl. No. 16/943,541, filed Jul. 30, 2020, Consisting of Specification, Claims, Abstract, and Drawings, 50 Pages.

Vasseur J.P., et al., "Path Computation Element (PCE) Communication Protocol (PCEP)," Request for Comments: 5440, Internet Engineering Task Force, IETF, Standards Track, Internet Society (ISOC) 4, Rue Des Falaises CH—1205, Geneva, Switzerland, Chapters 4-8, Mar. 2009, pp. 1-87.

Eckert Toerless et al. "Traffic Engineering for Bit Indexed Explicit Replication"; U.S. Appl. No. 16/457,339, filed Jun. 28, 2019; consisting of Specification Claims Abstract and Drawings (88 pages).

Previdi Stefano et al. "Segment Routing Extension Headers"; U.S. Appl. No. 16/525,000, filed Jul. 29, 2019; consisting of Specification Claims Abstract and Drawings (57 pages).

Psenak Peter et al. "Enforcing Strict Shortest Path Forwarding Using Strict Segment Identifier"; U.S. Appl. No. 16/384,219, filed Apr. 15, 2019; consisting of Specification Claims Abstract and Drawings (48 pages).

Wijnands Ijsbrand and Bob Thomas Cisco Systems Inc; Yuji Kamite and Hitoshi Fukuda NTT Communications; "Multicast Extensions for LDP;" Network Working Group; Internet Draft; Mar. 2005; pp. 1-12.

Akiya N. et al. "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.

Akiya N. et al. "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.

Akiya N. et al. "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.

Akiya N. et al. "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.

Akiya N. et al. "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.

Akiya N. "Segment Routing Implications on BFD"; Sep. 9, 2013; 3 pages.

Alcatel-Lucent "Segment Routing and Path Computation Element—Using Traffic Engineering to Optimize Path Placement and Efficiency in IPMPLS Networks"; Technology White Paper; 2015; 28 pages.

Aldrin S. et al. "Seamless Bidirectional Forwarding Detection (S-BFD) Use Cases"; draft-ietf-bfd-seamless-use-case-08; Network Working Group; Internet-Draft; May 6, 2016; 15 pages.

Awduche Daniel O. et al. "RSVP-TE: Extensions to RSVP for LSP Tunnels" Network Working Group Internet-Draft Aug. 2000 pp. 1-12.

Awduche Daniel O. et al. "RSVP-TE: Extensions to RSVP for LSP Tunnels" Network Working Group Request for Comments 3209 Dec. 2001 pp. 1-61.

Awduche D. et al. "Requirements for Traffic Engineering Over MPLS"; Network Working Group; Request for Comments: 2702; Sep. 1999; pp. 1-29.

Awduche D. et al. "Overview and Principles of Internet Traffic Engineering"; Network Working Group; Request for Comments: 3272; May 2002; pp. 1-71.

(56)                References Cited

OTHER PUBLICATIONS

Backes P. and Rudiger Geib "Deutsche Telekom AG's Statement About IPR Related to Draft-Geig-Spring-OAM-Usecase-01" Feb. 5, 2014 pp. 1-2.
Bryant S. et al. Cisco Systems "IP Fast Reroute Using Tunnels-draft-bryant-ipfrr-tunnels-03" Network Working Group Internet-Draft Nov. 16, 2007 pp. 1-30.
Bryant S. et al. Cisco Systems "Remote LFA FRR" draft-ietf-rtgwg-remote-lfa-04 Network Working Group Internet-Draft Nov. 22, 2013 pp. 1-24.
Cisco Systems Inc. "Introduction to Intermediate System-to-Intermediate System Protocol" published 1992-2002; pp. 1-25.
Crabbe E. et al. "PCEP Extensions for MPLS-TE LSP Protection with Stateful PCE Draft-Crabbe-PCE-Stateful-PCT-Protection-00" Network Working Group Internet-Draft Apr. 2013 pp. 1-12.
Crabbe E. et al. Stateful PCE Extensions for MPLS-TE LSPs draft-crabbe-pce-stateful-pce-mpls-te-00; Network Working Group Internet-Draft Oct. 15, 2012 pp. 1-15.
Deering S. et al. Cisco Internet Protocol Version 6 (IPv6) Specification Network Working Group Request for Comments 2460 Dec. 1998 pp. 1-39.
Eckert T. "Traffic Engineering for Bit Index Explicit Replication BIER-TE draft-eckert-bier-te-arch-00" Network Working Group Internet-Draft Mar. 5, 2015 pp. 1-21.
Eckert T. et al. "Traffic Engineering for Bit Index Explicit Replication BIER-TE draft-eckert-bier-te-arch-01" Network Working Group Internet-Draft Jul. 5, 2015 pp. 1-23.
Farrel A. et al. Old Dog Consulting A Path Computation Element (PCE)—Based Architecture Network Working Group Request for Comments 4655 Aug. 2006 pp. 1-80.
Farrel A. et al. Old Dog Consulting Inter-Domain MPLS and GMPLS Traffic Engineering—Resource Reservation Protocol-Traffic Engineering (RSVP-TE) Extensions Network Working Group Request for Comments 5151 Feb. 2008 pp. 1-25.
Fedyk D. et al. Alcatel-Lucent Generalized Multiprotocol Label Switching (GMPLS) Control Ethernet Provider Backbone Traffic Engineering (PBB-TE) Internet Engineering Task Force (IETF) Request for Comments 6060 Mar. 2011 pp. 1-20.
Filsfils C. et al. Cisco Systems Inc. "Segment Routing Architecture" draft-filsfils-rtgwg-segment-routing-00 Jun. 28, 2013; pp. 1-28.
Filsfils C. et al. Cisco Systems Inc. "Segment Routing Architecture"; draft-filsfils-rtgwg-segment-routing-01 Network Working Group Internet-Draft Oct. 21, 2013 pp. 1-28.
Filsfils C. et al. Cisco Systems Inc. "Segment Routing Interoperability with LDP"; draft-filsfils-spring-segment-routing-ldp-interop-01.txt; Apr. 18, 2014 pp. 1-16.
Filsfils C. et al. "Segment Routing Architecture"; draft-ietf-spring-segment-routing-07; Network Working Group Internet-Draft; Dec. 15, 2015; pp. 1-24.
Filsfils C. et al.; "Segment Routing Use Cases"; draft-filsfils-rtgwg-segment-routing-use-cases-01; Network Working Group; Internet-Draft; Jul. 14, 2013; pp. 1-46.
Filsfils C. et al. "Segment Routing Use Cases" draft-filsfils-rtgwg-segment-routing-use-cases-02; Network Working Group; Internet-Draft; Oct. 21, 2013; pp. 1-36.
Filsfils C. et al. "Segment Routing with MPLS Data Plane" draft-ietf-spring-segment-routing-mpls-05; Network Working Group; Internet-Draft; Jul. 6, 2016; 15 pages.
Frost D. et al. Cisco Systems Inc. "MPLS Generic Associated Channel (G-Ach) Advertisement Protocol" draft-ietf-mpls-gach-adv-00 Internet-Draft Jan. 27, 2012 pp. 1-17.
Frost D. et al. Cisco Systems Inc. "MPLS Generic Associated Channel (G-Ach) Advertisement Protocol" draft-ietf-mpls-gach-adv-08 Internet-Draft Jun. 7, 2013 pp. 1-22.
Frost D. et al. Cisco Systems Inc. "MPLS Generic Associated Channel (G-Ach) Advertisement Protocol" Request for Comments 7212 Jun. 2014 pp. 1-23.
Geib R. "Segment Routing Based OAM Use Case" IETF 87 Berlin Jul.Aug. 2013 pp. 1-3.

Geib R. Deutsch Telekom "Use Case for a Scalable and Topology Aware MPLS data plan monitoring System" draft-geib-spring-oam-usecase-00; Internet-Draft Oct. 17, 2013 pp. 1-7.
Geib R. Deutsch Telekom "Use Case for a Scalable and Topology Aware MPLS Data Plan Monitoring System" draft-geib-spring-oam-usecase-01; Internet-Draft Feb. 5, 2014 pp. 1-10.
Gredler H. et al. Juniper Networks Inc. "Advertising MPLS Labels in IS-IS draft-gredler-isis-label-advertisement-00" Internet-Draft; Apr. 5, 2013; pp. 1-13.
Gredler H. et al. hannes@juniper.net IETF87 Berlin "Advertising MPLS LSPs in the IGP" draft-gredler-ospf-label-advertisement May 21, 2013; pp. 1-14.
Guilbaud Nicolas and Ross Cartlidge "Google—Localizing Packet Loss in a Large Complex Network" Feb. 5, 2013 pp. 1-43.
Imaizumi H. et al.; Networks 2005; "FMEHR: An Alternative Approach to Multi-Path Forwarding on Packed Switched Networks" pp. 196-201.
Kompella K. et al Juniper Networks "Label Switched Paths (LSP) Hierarchy with Generalized Multi-Protocol Label Switching (GMPLS) Traffic Engineering (TE)" Network Working Group Request for Comments 4206 Oct. 2005 pp. 1-14.
Kompella K. et al. Juniper Networks Inc. "Detecting Multi-Protocol Label Switched (MPLS) Data Plane Failures" Network Working Group Request for Comments 4379 Feb. 2006 pp. 1-50.
Kompella K. et al. Juniper Networks "Virtual Private LAN Service (VPLS) Using BGP for Auto-Discovery and" Network Working Group Request for Comments 4761 Jan. 2007 pp. 1-28.
Kumar N. et al. Cisco Systems Inc. "Label Switched Path (LSP) PingTrace for Segment Routing Networks Using MPLS Dataplane" draft-kumar-mpls-spring-lsp-ping-00 Oct. 21, 2013 pp. 1-12.
Kumar N. et al "Label Switched Path (LSP) PingTrace for Segment Routing Networks Using MPLS Dataplane" draft-kumarkini-mpls-spring-lsp-ping-00; Network Work Group; Internet-Draft; Jan. 2, 2014 pp. 1-15.
Examination Report in counterpart European Application No. 21 178 606.6, mailed Apr. 13, 2023, 5 pages.
Bashandy A.R., et al., "Segment Routing Over Label Distribution Protocol," U.S. Appl. No. 16/367,869, filed Mar. 28, 2019, 37 pages.
Bocci M., et al., "MPLS Generic Associated Channel," Network Working Group, RFC 5586, The Internet Society, Reston, VA, USA, Jun. 2009, 19 pages.
Bryant S.F., et al., "Opportunistic Compression of Routing Segment Identifier Stacks," U.S. Appl. No. 14/449,632, filed Aug. 1, 2014, Consisting of Specification, Claims and Abstract and Drawings, 59 Pages.
Eckert T., et al., "Failure Protection for Traffic-Engineered Bit Indexed Explicit Replication," U.S. Appl. No. 15/054,480, filed Feb. 26, 2016, consisting of Specification, Claims, Abstract and Drawings, 76 pages.
Eckert T., et al., "Traffic Engineering for Bit Index Explicit Replication," U.S. Appl. No. 14/814,574, filed Jul. 31, 2015, consisting of Specification, Claims, Abstract and Drawings, 25 pages.
Eckert T., et al., "Traffic Engineering for Bit Index Explicit Replication," U.S. Appl. No. 14/862,915, filed Sep. 23, 2015, consisting of Specification, Claims, Abstract, and Drawings, 93 pages.
Eckert T., et al., "Traffic Engineering for Bit Indexed Explicit Replication," U.S. Appl. No. 14/814,575, filed Jul. 31, 2015, consisting of Specification, Claims, Abstract and Drawings, 93 Pages.
Extended European Search Report for European Application No. 19206362.6, mailed Jan. 21, 2020, 9 Pages.
Extended European Search Report for European Application No. 21178606.6, mailed Aug. 24, 2021, 9 Pages.
Filsfils C., et al., "Seamless Segment Routing," U.S. Appl. No. 15/639,398, filed Jun. 30, 2017, Consisting of Specification, Claims, Abstract, and Drawings, 31 pages.
Filsfils C., et al., "Segment Routing Into a Label Distribution Protocol Domain," U.S. Appl. No. 15/280,262, filed Sep. 29, 2016, consisting of Specification, Claims, Abstract, and Drawings, 28 pages.
Francois P.J.R., et al., "Loop Avoidance During Network Convergence in Switched Networks," U.S. Appl. No. 14/319,353, filed Jun.

(56)                    References Cited

OTHER PUBLICATIONS 30, 2014, Consisting of Specification, Claims and Abstract (29 Pages), and Drawings (6 Sheets).

Frost D.C., et al., "MPLS Segment Routing," U.S. Appl. No. 15/637,744, filed Jun. 29, 2017, Consisting of Specification, Claims, Abstract, and Drawings, 26 Pages.

International Preliminary Report on Patentability for International Application No. PCT/US2013/063516, mailed Apr. 16, 2015, 9 Pages.

International Preliminary Report on Patentability for International Application No. PCT/US2013/063603, mailed Apr. 16, 2015, 10 Pages.

International Preliminary Report on Patentability for International Application No. PCT/US2014/018226, mailed Sep. 24, 2015, 9 Pages.

International Preliminary Report on Patentability for International Application No. PCT/US2014/027934, mailed Sep. 24, 2015, 8 Pages.

International Preliminary Report on Patentability for International Application No. PCT/US2014/028526, mailed Sep. 24, 2015, 8 Pages.

International Preliminary Report on Patentability for International Application No. PCT/US2014/028709, mailed Sep. 24, 2015, 8 Pages.

International Search Report and Written Opinion for International Application No. PCT/US2013/063516, mailed Dec. 3, 2013, 11 Pages.

International Search Report and Written Opinion for International Application No. PCT/US2013/063603, mailed Dec. 17, 2013, 12 Pages.

International Search Report and Written Opinion for International Application No. PCT/US2014/018226, mailed Jul. 8, 2014, 10 Pages.

International Search Report and Written Opinion for International Application No. PCT/US2014/027934, mailed Jun. 2, 2014, 11 Pages.

International Search Report and Written Opinion for International Application No. PCT/US2014/028526, mailed Jun. 3, 2014, 10 Pages.

International Search Report and Written Opinion for International Application No. PCT/US2014/028709, mailed May 30, 2014, 11 Pages.

Kompella K., Ed. et al., "Routing Extensions in Support of Generalized Multi-Protocol Label Switching (GMPLS)," Network Working Group, Copyright © The Internet Society, Oct. 2005, pp. 1-28.

Kompella K., et al., "The Use of Entropy Labels in MPLS Forwarding," Internet Engineering Task Force (IETF), Request for Comments 6790, Level 3 Communications, Inc., Nov. 2012, pp. 1-25.

Marco T., et al., "Local Detection and Recovery from Multi-Failure Patterns in MPLS-TE Networks," IEEE International Conference on Communications, Jun. 11-15, 2006, pp. 658-663.

Nainar N.K., et al., "Reroute Detection in Segment Routing Data Plane," U.S. Appl. No. 15/266,498, filed Sep. 15, 2016, Consisting of Specification, Claims, Abstract, and Drawings, pp. 1-61.

Papadimitriou D., et al., "Inference of Shared Risk Link Groups," draft-many-inference-srlg-02.txt, Internet Working Group, Internet Draft, Nov. 2001, pp. 1-18.

Previdi S., et al., "Segment Routing Extension Headers," U.S. Appl. No. 14/212,084, filed Mar. 14, 2014, Consisting of Specification, Claims and Abstract and Drawings, 60 pages.

Previdi S.B., et al., "Segment Routing Extension Headers," No. U.S. Appl. No. 15/677,210, filed Aug. 15, 2017, Consisting of Specification, Claims, Abstract and Drawings, 58 Pages.

Previdi S.B., et al., "Segment Routing Using a Remote Forwarding Adjacency Identifier," U.S. Appl. No. 14/334,300, filed Jul. 17, 2014, Consisting of Specification, Claims, Abstract and Drawings, 31 pages.

Psenak P., et al., "Enforcing Strict Shortest Path Forwarding Using Strict Segment Identifiers," U.S. Appl. No. 15/165,794, filed May 26, 2016, Consisting of Specification, Claims, Abstract and Drawings, 52 Pages.

Wijnands I., et al., "Area-Specific Broadcasting Using Bit Indexed Explicit Replication," U.S. Appl. No. 15/347,443, filed Nov. 9, 2016, Consisting of Specification, Claims, Abstract and Drawings, 65 Pages.

Wikipedia, "Shared Risk Resource Group," May 17, 2018, pp. 1-5, URL: https://en.wikipedia.org/wiki/Shared_Risk_Resource_Group.

Previdi S., et al., "Segment Routing Extension Headers," U.S. Appl. No. 17/387,114, filed Jul. 28, 2021, Consisting of Specification, Claims and Abstract and Drawings, 59 pages.

Kumar N. et al "OAM Requirements for Segment Routing Network"; draft-kumar-spring-sr-oam-requirement-00; Spring; Internet-Draft; Feb. 14, 2014; 6 pages.

Kumar N. et al "OAM Requirements for Segment Routing Network"; draft-kumar-spring-sr-oam-requirement-01; Spring; Internet-Draft; Jul. 1, 2014; 6 pages.

Kumar N. et al "OAM Requirements for Segment Routing Network"; draft-kumar-spring-sr-oam-requirement-02; Spring; Internet-Draft; Dec. 31, 2014; 6 pages.

Kumar N. et al "OAM Requirements for Segment Routing Network"; draft-kumar-spring-sr-oam-requirement-03; Spring; Internet-Draft; Mar. 9, 2015; 6 pages.

Kumar N. et al. "Label Switched Path (LSP) PingTrace for Segment Routing Networks Using MPLS Dataplane" draft-ietf-mpls-spring-lsp-ping-00; Network Work Group; Internet Draft; May 10, 2016; 17 pages.

Pignataro C. et al. "Seamless Forwarding Detection (S-BFD) for IPv4 IPv6 and MPLS" draft-ietf-bfd-seamless-ip-06; Internet Engineering Task Force; Internet-Draft; May 6, 2016; 8 pages.

Pignataro C. et al. "Seamless Bidirectional Forwarding Detection (S-BFD)"; draft-ietf-bfd-seamless-base-11; Internet Engineering Task Force; Internet-Draft; May 6, 2016; 21 pages.

Previdi S. et al. Cisco Systems Inc. "Segment Routing with IS-IS Routing Protocol draft-previdi-filsfils-isis-segment-routing-00" IS-IS for IP Internets Internet-Draft Mar. 12, 2013 pp. 1-27.

Previdi S. et al. Cisco Systems Inc. "Segment Routing with IS-IS Routing Protocol draft-previdi-filsfils-isis-segment-routing-02" Internet-Draft Mar. 20, 2013 A55 pp. 1-27.

Previdi S. et al. "IS-IS Extensions for Segment Routing"; draft-ietf-isis-segment-routing-extensions-05; IS-IS for IP Internets Internet-Draft; Jun. 30, 2015; pp. 1-37.

Previdi S. et al. "IS-IS Extensions for Segment Routing"; draft-ietf-isis-segment-routing-extensions-06; IS-IS for IP Internets Internet-Draft; Dec. 14, 2015; pp. 1-39.

Psenak P. et al. "OSPF Extensions for Segment Routing" draft-ietf-ospf-segment-routing-extensions-05; Open Shortest Path First IGP; Internet-Draft; Jun. 26, 2015; pp. 1-29.

Raszuk R. NTT I3 "MPLS Domain Wide Labels" draft-raszuk-mpls-domain-wide-labels-00 MPLS Working Group Internet-Draft Jul. 14, 2013 pp. 1-6.

Rosen E. et al. Cisco Systems Inc. "BGPMPLS VPNs" Network Working Group Request for Comments: 2547; Mar. 1999 pp. 1-26.

Rosen E. et al. Cisco Systems Inc. "Multiprotocol Label Switching Architecture" Network Working Group Request for Comments: 3031; Jan. 2001 pp. 1-61.

Sivabalan S. et al.; "PCE-Initiated Traffic Engineering Path Setup in Segment Routed Networks; draft-sivabalan-pce-segmentrouting-00. txt" Internet Engineering Task Force IETF; Standard Working Draft Internet Society (ISOC) 4 Rue Des Falaises CH-1205 Geneva Switzerland Jun. 2013 pp. 1-16.

Li T. et al. Redback Networks Inc. "IS-IS Extensions for Traffic Engineering" Network Working Group Request for Comments 5305 Oct. 2008 17 pages.

Tian Albert J. et al. Redback Networks "Source Routed MPLS LSP Using Domain Wide Label draft-tian-mpls-lsp-source-route-01.txt" Network Working Group Internet Draft Jul. 2004 pp. 1-12.

Vasseur JP et al.; Cisco Systems Inc. "A Link-Type Sub-TLV to Convey the No. of Traffic Engineering Label Paths Signaled with

(56)     References Cited

OTHER PUBLICATIONS

Zero Reserved Bandwidth Across a Link" Network Working Group
Request for Comments 5330; Oct. 2008 16 pages.

* cited by examiner

SEGMENT ROUTING: PCE DRIVEN DYNAMIC SETUP OF FORWARDING ADJACENCIES AND EXPLICIT PATH

RELATED APPLICATIONS

This application is a continuation of U.S. patent application Ser. No. 16/599,975, entitled "Segment Routing: PCE Driven Dynamic Setup of Forwarding Adjacencies and Explicit Path," filed Oct. 11, 2019, now U.S. Pat. No. 11,424,987 and issued on Aug. 23, 2022; which is a continuation of the U.S. patent application Ser. No. 15/394,169, entitled "Segment Routing: PCE Driven Dynamic Setup of Forwarding Adjacencies and Explicit Path," filed Dec. 29, 2016, now U.S. Pat. No. 10,469,325 and issued on Nov. 5, 2019; which is a continuation of U.S. application Ser. No. 14/211,101, entitled "Segment Routing: PCE Driven Dynamic Setup of Forwarding Adjacencies and Explicit Path," filed Mar. 14, 2014, now U.S. Pat. No. 9,571,349 and issued on Feb. 14, 2017; which claims the domestic benefit under Title 35 of the United States Code § 119 (e) of U.S. Provisional Application Ser. No. 61/791,242, entitled "Segment Routing," filed Mar. 15, 2013. All are hereby incorporated by reference in their entirety and for all purposes as if completely and fully set forth herein.

BACKGROUND

Network nodes forward packets using forwarding tables. Network nodes may take form in one or more routers, one or more bridges, one or more switches, one or more servers, or any other suitable communications processing device. A packet is a formatted unit of data that typically contains control information and payload data. Control information may include: source and destination IP addresses, error detection codes like checksums, sequencing information, etc. Control information is typically found in packet headers and trailers, with payload data in between.

Packet forwarding requires a decision process that, while simple in concept, can be complex. Since packet forwarding decisions are handled by network nodes, the total time required for this can become a major limiting factor in overall network performance.

Multiprotocol Label Switching (MPLS) is one packet forwarding mechanism. MPLS Nodes make packet forwarding decisions based on Label Distribution Protocol (LDP) distributed labels attached to packets and LDP forwarding tables. LDP is a process in which network nodes capable of MPLS exchange LDP labels (hereinafter labels). Packet forwarding based on labels stands in stark contrast to traditional Internet Protocol (IP) routing in which packet forwarding decisions are made by nodes using IP addresses contained within the packet.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

1. Overview

Figure 1:
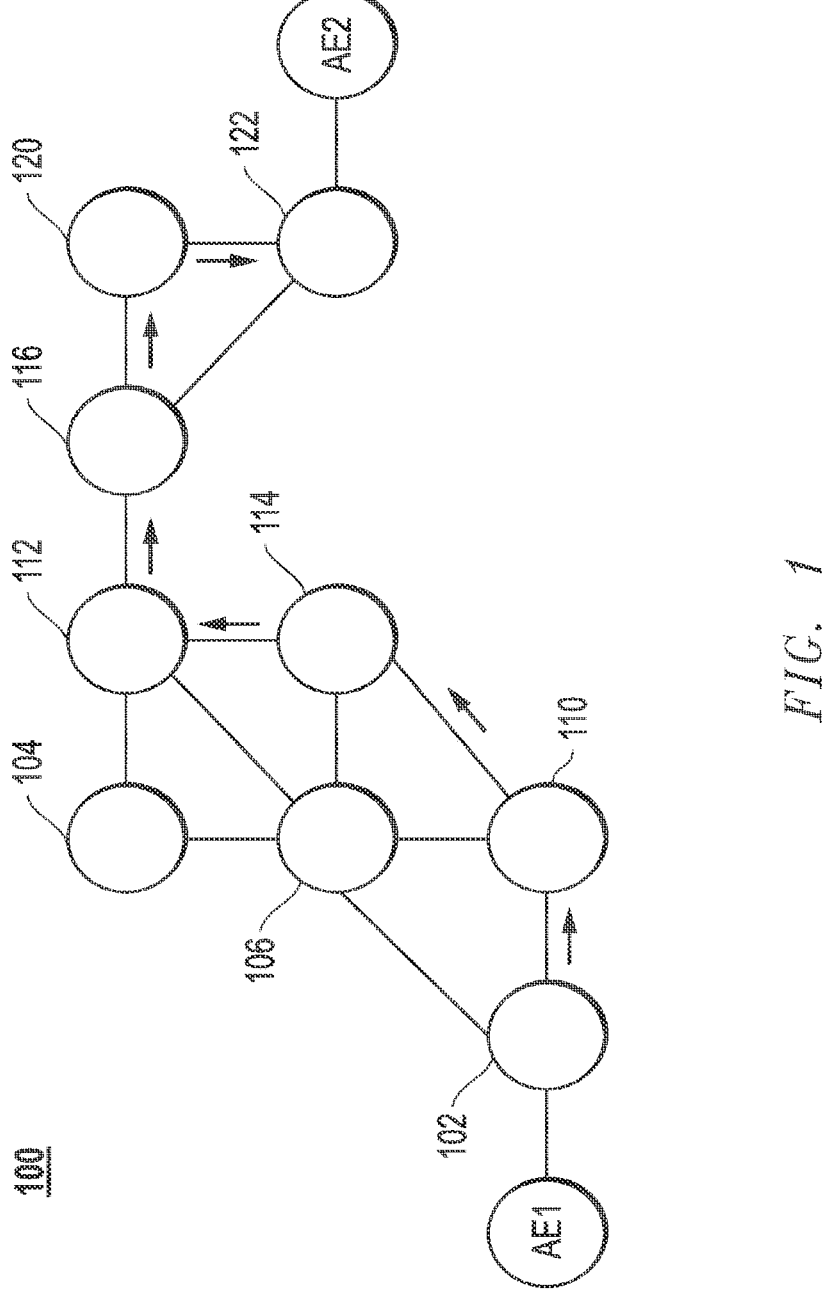
FIG. 1 is a block diagram illustrating certain components of an example network.

An apparatus and method is disclosed for path-creation element driven dynamic setup of forwarding adjacencies and explicit path. In one embodiment of the method, a node receives an instruction to create a tunnel between the node and another node. The node creates or initiates the creation of the tunnel in response to receiving the instruction, wherein the tunnel comprises a plurality of nodes in data communication between the node and the other node. The node maps a first identifier (ID) to information relating to the tunnel. The node advertises the first ID to other nodes in a network of nodes.

2. Packet Forwarding Mechanisms

IP routing and MPLS are distinct packet forwarding mechanisms. IP routing uses IP addresses inside packet headers to make packet forwarding decisions. In contrast, MPLS implements packet forwarding decisions based on short path identifiers called labels attached to packets. Segment routing (SR) is yet another packet forwarding mechanism and can be seen as a modification of MPLS. SR is similar to MPLS in many regards and employs many of the data plane functions thereof. For example, like MPLS packet forwarding decisions in SR can be based on short path identifiers called segment IDs attached to packets. While similarities exist between MPLS and SR, substantial differences exist between SR and traditional MPLS as will be more fully described below.

2.1 IP Packet Routing

IP packet routing uses IP forwarding tables, which are created at nodes using routing information distributed between nodes via one or more protocols like the internal gateway protocol (IGP) and/or the border gateway protocol (BGP). In simple terms, IP forwarding tables map destination addresses to the next hops that packets take to reach their destinations. When a node receives a packet, the node can access a forwarding table using the packet's destination IP address and lookup a corresponding egress interface to the next hop. The node then forwards the packet through the egress interface. The next hop that receives the packet performs its own forwarding table lookup using the same destination IP address in the packet, and so on.

2.2 MPLS and LDP

MPLS is commonly employed in provider networks consisting of interconnected LDP nodes. For the purposes of explanation, LDP nodes take form in MPLS enabled nodes that also implement LDP in the control plane. Packets enter an MPLS network via an ingress edge LDP node, travel hop-by-hop along a label-switched path (LSP) that typically includes one or more core LDP nodes, and exit via an egress edge LDP node.

Packets are forwarded along an LSP based on labels and LDP forwarding tables. Labels allow for the use of very fast and simple forwarding engines in the data planes of nodes. Another benefit of MPLS is the elimination of dependence on a particular Open Systems Interconnection (OSI) model data link layer technology to forward packets.

A label is a short, fixed-length, locally significant identifier that can be associated with a forwarding equivalence class (FEC). Packets associated with the same FEC should follow the same LSP through the network. LSPs can be established for a variety of purposes, such as to guarantee a certain level of performance when transmitting packets, to forward packets around network congestion, to create tunnels for such things as network-based virtual private networks, etc. In many ways, LSPs are no different than circuit-switched paths in ATM or Frame Relay networks, except that they are not dependent on a particular Layer 2 technology.

LDP is employed in the control planes of nodes. For purpose of explanation, LDP nodes are those nodes that employ only LDP in their control plane. Two LDP nodes, called LDP peers, can bi-directionally exchange labels on a FEC by FEC basis when setting up an LSP. Some LSPs can be set up using resource reservation protocol (RSVP) tunnel engineering. LDP can be used in a process of building and maintaining LDP forwarding tables that map labels and next hop egress interfaces. These forwarding tables can be used to forward packets through MPLS networks as more fully described below.

When a packet is received by an ingress edge LDP node of an MPLS network, the ingress node may use information in the packet to determine a FEC corresponding to an LSP the packet should take across the network to reach the packet's destination. In one embodiment, the FEC is an identifier of the egress edge node that is closest to the packet's destination IP address. In this embodiment, the FEC may take form in the egress edge node's loopback address.

Characteristics for determining the FEC for a packet can vary, but typically the determination is based on the packet's destination IP address. Quality of Service for the packet or other information may also be used to determine the FEC. Once determined, the ingress edge LDP node can access a table to select a label that is mapped to the FEC. The table may also map a next hop egress interface to the FEC. Before the ingress edge LDP node forwards the packet to the next hop via, the ingress node attaches the label.

When an LDP node receives a packet with an attached label (i.e., the incoming label), the node accesses an LDP forwarding table to read a next hop egress interface and another label (i.e., an outgoing label), both which are mapped to the incoming label. Before the packet is forwarded via the egress interface, the LDP node swaps the incoming label with the outgoing label. The next hop receives the packet with label and may perform the same process. This process is often called hop-by-hop forwarding along a non-explicit path (i.e., the LSP). The penultimate node in the LSP may pop or remove the incoming label before forwarding the packet to an egress edge LDP node in the network, which in turn may forward the packet towards its destination using the packet's destination address and an IP forwarding table. In another embodiment, the last node in the LSP may pop the incoming label before forwarding the packet using the destination address and an IP forwarding table.

To illustrate MPLS aspects, FIG. 1 shows a portion of an example MPLS network 100 that includes LDP nodes 102-122 coupled together via communication links. An LSP from node 102 to node 122 can be created so that all packets of a stream associated with a particular FEC sent from node 102 to node 122 will travel through the same set of nodes. Each LDP node maintains information for the LSP established through it in an LDP forwarding table. Thus, if node 110 knows that node 114 is the next hop along the LSP for all packets received from node 102 that are destined for node 122, node 110 can forward the packets to node 114.

2.3 Segment Routing

Segment routing (SR) is a mechanism in which nodes forward packets using SR forwarding tables and segment IDs. This forwarding mechanism can use the data plane of MPLS with slight modifications as will be more fully described below. As such, the forwarding engines in the data planes of SR nodes are very similar to the forwarding engines in the data planes of SR nodes. Like MPLS, SR enables very fast and simple forwarding engines in the data plane of nodes. SR is not dependent on a particular Open Systems Interconnection (OSI) model data link layer technology to forward packets.

SR nodes (i.e., nodes employing SR but not LDP) make packet forwarding decisions based on segment IDs as opposed to LDP distributed labels, and as a result SR nodes need not employ LDP in their control planes. In one embodiment, segment IDs are substantially shorter than labels. The range for segment IDs may be distinct from the range for labels. Unless otherwise indicated, the SR nodes lack LDP in their control plane.

Packets can enter an SR enabled network via an ingress edge SR node, travel hop-by-hop along a segment path (SP) that includes one or more core SR nodes, and exit the network via an egress edge SR node.

Like labels, segment IDs are short (relative to the length of an IP address or a FEC), fixed-length identifiers. In one embodiment, segment IDs are shorter than labels. Segment IDs may correspond to topological segments of a network, services provided by network nodes, etc. Topological segments represent one hop or multi hop paths to SR nodes. Topological segments act as sub-paths that can be combined to form an SP. Stacks of segment IDs can represent SPs, including sub paths called SR tunnels that are more fully described below. SPs can be associated with FECs as will be more fully described below.

There are several types of segment IDs including nodal-segment IDs, adjacency-segment IDs, forwarding adjacency (FA)-segment IDs, etc. Nodal-segment IDs are assigned to SR nodes so that no two SR nodes belonging to a network domain are assigned the same nodal-segment ID. Nodal-segment IDs can be mapped to unique node identifiers such as node loopback IP addresses (hereinafter loopbacks). In one embodiment, all assigned nodal-segment IDs are selected from a predefined ID range (e.g., [32, 5000]). A nodal-segment ID corresponds to a one-hop or a multi-hop, shortest path (SPT) to an SR node assigned the nodal-segment ID as will be more fully described below.

An adjacency-segment ID represents a direct link between adjacent SR nodes in a network. Links can be uniquely identified. For purposes of explanation only, this disclosure will identify a link using the loopbacks of nodes between which the link is positioned. To illustrate, for a link between two nodes identified by node loopback X and node loopback Y, the link will be identified herein as link XY. Because loopbacks are unique, link IDs are unique. Link IDs should not be confused with adjacency-segment IDs; adjacency-segment IDs may not be unique within a network. This disclosure will presume that only one link exists between nodes in a network, it being understood the present disclosure should not be limited thereto.

Each SR node can assign a distinct adjacency-segment ID for each of the node's links. Adjacency-segment IDs are locally significant; separate SR nodes may assign the same adjacency-segment ID, but the adjacency-segment ID represents distinct links. In one embodiment, adjacency-segment IDs are selected from a predefined range that is outside the predefined range for nodal-segment IDs.

A forwarding adjacency (FA)-segment ID represents an SR tunnel or an MPLS traffic engineering (TE) tunnel between a pair of nodes referred to as the head end and tail end nodes. Head end and/or tail end nodes can create an SR tunnel or a TE tunnel under direction of a path computation (PC) node. The head end and tail end nodes may be SR enabled or both SR and LDP (SR/LDP) enabled as will be more fully described below. Tunnels enable PC nodes to optimize operation of a network.

The SR tunnel constitutes several SR nodes that create a path between the SR head end and tail end nodes. In this regard, the FA-segment ID may correspond to a stack of nodal-segment IDs of the respective SR nodes constituting the path between SR head end and tail end nodes. The FA-segment ID may also correspond to a TE tunnel between SR/LDP head end and tail end nodes. In this latter embodiment, the head end and tail end nodes are both SR and LDP enabled, while the intervening nodes are LDP enabled. All FA-segment IDs are selected from a predefined range of IDs that are outside the ranges for the nodal-segment IDs and adjacency-segment IDs.

SR or SR/LDP nodes can advertise routing information including nodal-segment IDs bound to loopbacks, adjacency-segment IDs mapped to link IDs, FA-segment IDs bound to loopbacks of nodes constituting the SR or TE tunnel, etc., using protocols such as IGP and/or BGP with an appropriate SR extension. Nodes, including path computation (PC) nodes, may use the routing information they receive in order to create topology maps of the network. SR forwarding tables can be created or updated through use of these maps. To illustrate, a node can use the map it creates to identify next hop egress interfaces for shortest paths (SPTs) to respective node loopbacks. The identified SPT or next hop egress interfaces for the loopbacks are then mapped to respective nodal-segment IDs in the forwarding table.

SR nodes can also map their adjacency-segment IDs to egress interfaces for respective links in SR forwarding tables. Because adjacency-segment IDs are locally significant, however, adj acency-segment IDs should only be mapped in SR forwarding tables of the nodes that advertise the adj acency-segment IDs. In other words, an SR node that advertises an adjacency-segment ID should be the only node in the network area that has a SR forwarding table that maps the adjacency-segment ID to an egress interface.

FA-segment IDs are also locally significant. As a result FA-segment IDs should only be mapped in SR nodes or SR/LDP nodes that advertise the FA-segment IDs. FA-segment IDs are not mapped to egress interfaces. Rather, FA-segment IDs can be mapped in SR nodes to stacks of segment IDs, which in turn correspond to SR nodes and/or links constituting respective SR tunnels. Alternatively, the FA-segment IDs can be mapped to labels in SR/LDP nodes, which in turn correspond to respective TE tunnels.

As noted above, SR enables segment paths (SPs), including SR tunnels, through a network. SPs can be associated with FECs. Packets associated with the same FEC normally traverse the same SP to reach their destination. Nodes in SPs make forwarding decisions based on segment IDs, not based on the contents (e.g., destination IP addresses) of packets. As such, packet forwarding in SPs is not dependent on a particular Layer 2 technology.

As noted above, nodes, including PC nodes, can use advertised routing information to create topological maps, and these maps can be used to create SPs including SR tunnels. The nodes can also use advertised routing information such as nodal-segment IDs bound to loopbacks, adjacency-segment IDs mapped to link IDs, FA-segment IDs bound to SR tunnels or TE tunnels, etc., to generate ordered lists of segment IDs (i.e., segment ID stacks) for the paths or tunnels. Individual segment IDs in a stack may correspond to respective segments or sub paths, including SR tunnels or TE tunnels, of a corresponding path.

When an ingress edge SR node receives a packet, the node or a PC node in data communication with the node, can select a segment path (SP) for the packet based on information contained in the packet. In one embodiment, a FEC may be determined for the packet using the packet's destination IP address. Like MPLS, this FEC may take form in an identifier (e.g., loopback) of an egress edge node through which the packet's destination can be reached. The FEC can then be used to select a segment ID stack mapped thereto. The ingress edge node can attach the selected segment ID stack to the packet via a header. The packet with attached segment ID stack is forwarded along and traverses the segments of the SP in an order that corresponds to the list order of the segment IDs in the stack. A forwarding engine operating in the data plane of each SR or SR/LDP node can use the top segment ID within the stack to lookup the egress interface for next hop. As the packet and attached segment ID stack are forwarded along the SP in a hop-by-hop fashion, segment IDs can be popped off the top of the stack. In another embodiment, the attached stack of segment IDs remains unchanged as the packet is forwarded along the SP. In this embodiment, a pointer to an active segment ID in the stack can be advanced as the packet is forwarded along the SP. In contrast to MPLS that uses labels to forward packets, nodal-segment IDs and adjacency-segment IDs are not swapped as the packet and attached segment ID stack are forwarded along the SP. An SR node that advertises an FA-segment ID, however, may swap the FA-segment ID with a stack of segment IDs mapped thereto, or an SR/LDP node that advertises an FA-segment ID may swap the FA-segment ID for a label mapped thereto.

Figure 2:
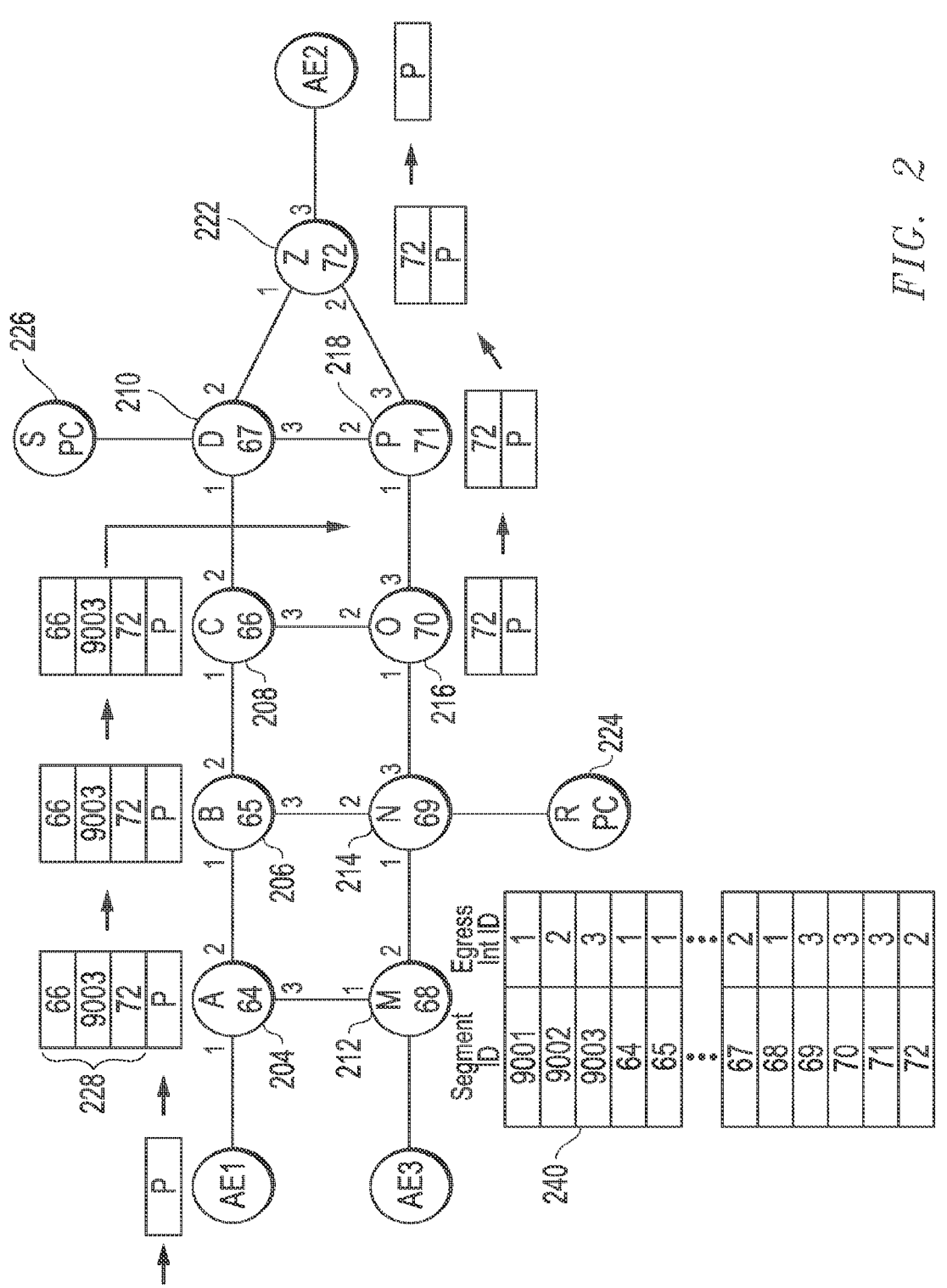
FIG. 2 is a block diagram illustrating certain components of an example network.

To illustrate general concepts of SR, FIG. 2 shows an example SR enabled provider network that is in data communication with nodes AE1-AE3. The network consists of SR nodes 204-222 and PC nodes 224 and 226. Nodes 204-210 are assigned unique nodal-segment IDs 64-67, respectively, nodes 212-218 are assigned unique nodal-segment IDs 68-71, respectively, and node 222 is assigned unique nodal-segment ID of 72. Each of the SR nodes 204-222 have interfaces that are identified as shown. For example, node 204 has three interfaces designated 1-3, respectively. Each of the nodes 204-222 is assigned a unique loopback. Loopbacks A-D are assigned to nodes 204-210, respectively, loopbacks M-P are assigned to nodes 212-218 respectively, loopback R is assigned to PC node 224, loopback S is assigned to node 226, and loopback Z is assigned to node 222. Loopbacks are unique in the network and can be used for several purposes such as calculating the topology of the network, which in turn can be used to create paths or tunnels, to identify SPTs and thus next hop egress interfaces for SR forwarding tables, etc.

One or more nodes 204-222 can also assign locally significant adjacency-segment IDs and FA-segment IDs. For example, node 208 can assign adjacency-segment IDs 9001-9003 to links CB, CD, and CO, respectively. Node 206 can assign FA-segment ID 5500 to an SR tunnel constituting nodes 206, 208, 216, and 218. Nodes 204-222 and PC nodes 224 and 226 collect all information needed for topology creation via IGP and/or BGP. PC nodes 224 and 226 also collect additional information relevant to the state and performance of the network.

Each SR node can advertise routing and performance information to the other nodes in a network, including PC nodes, using IGP and/or BGP with SR extension. For example, node 208 can generate and send one or more advertisements that include adjacency-segment IDs 9001-9003 bound to link IDs CB, CD, and CO, respectively, and nodal-segment ID 66 bound to loopback C. Node 206 may generate an advertisement that includes FA-segment ID 5500 bound to a list of loopbacks B, C, O, and P, which in turn represent the nodes in an SR tunnel or a TE tunnel.

Using the advertisements they receive, the control planes of nodes 204-222 can generate respective SR forwarding tables for use in the data planes. For example, node 208 can generate example SR forwarding table 240 that maps adjacency-segment IDs 9001-9003 to node interface IDs 1-3, respectively, and nodal-segment IDs such as 64, 65, 67, 70, and 72, to node 208 interfaces 1, 1, 2, 3, and 2, respectively, which are the SPT next hop egress interfaces determined by node 208 for loopbacks A, B, D, O, and Z respectively. In the embodiment shown, only SR forwarding table 240 maps adjacency-segment IDs 9001-9003 to interfaces; SR forwarding tables in the other nodes of network 202 should not map adjacency-segment IDs 9001-9003.

In addition to creating SR forwarding tables, SR nodes, SR/LDP or PC nodes 224 and 226 can create segment ID stacks for respective SPs including SR tunnels. For example, ingress edge node 204 or PC node 226 on request can create example segment ID stack 228 for an SP between ingress edge node 204 and egress edge node 222. Example segment stack 228 can be created for a particular FEC (e.g., FEC Z). Example stack 228 includes three segment IDs: nodal-segment IDs 66 and 72 advertised by nodes 208 and 222, respectively, and adjacency-segment ID 9003 advertised by node 208. Stack 228 corresponds to an SP in which packets flow in order through nodes 204, 206, 208, 216, 218, and 222. Node 206 can use loopback/nodal-segment ID bindings to create a tunnel segment ID stack consisting of nodal-segment IDs consisting of 66, 70, and 71. After creation, node 206 maps the tunnel segment ID stack to FA-segment ID 5500. No other node should map this tunnel segment ID stack to FA-segment ID 5500. Tunnel segment ID stack 66, 70, and 71 corresponds to a tunnel in which packets flow in order through nodes 206, 208, 216, and 218.

To illustrate basic SR consider SR node 204 receiving a packet P that is destined for a device that can be reached via AE2, which in turn can be reached via node 222. In response SR node 204 can select a segment ID stack based on information contained in the packet. For example, node 204 can select FEC Z (i.e., the loopback for node 222) for a received packet P based on the destination IP address in packet P and/or other information. FEC Z is mapped to example stack 228 in a table not shown. Node 204 attaches stack 228 to packet P. Example segment stack 228 lists segment IDs that correspond to one hop and multi hop segments that packets traverse to reach egress edge node 222. The one hop and multi hop segments collectively form the SP corresponding to stack 228. Once the segment stack 228 is attached to packet P, ingress SR enable node 204 may access a SR forwarding table (not shown) using the top segment ID (e.g., segment ID=66) of the stack to read egress interface identifier 2, which is the next hop egress interface for the SPT to the SR node assigned nodal-segment ID 66.

Figure 3:
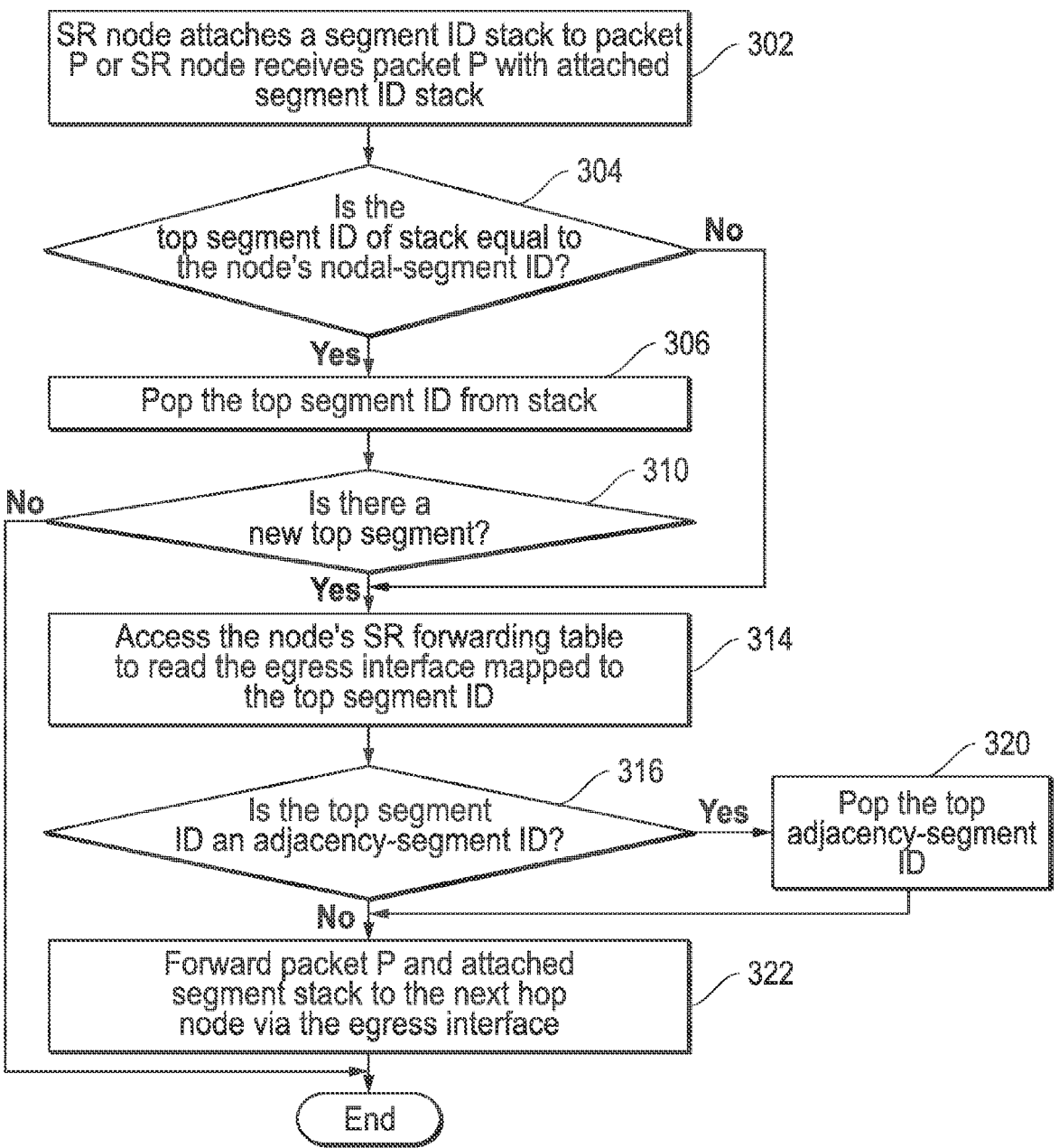
FIG. 3 is a flow chart illustrating an example process employed by a node of FIG. 2.

With continuing reference to FIG. 2, FIG. 3 illustrates an example of a general process of packet forwarding using nodal and adjacency-segment IDs according to one embodiment. More particularly, FIG. 3 illustrates an example method that can be performed by an SR node, including an edge node, in a network like that shown in FIG. 2. In response to receiving a packet with an attached segment ID stack, or in response to attaching a segment ID stack to a packet, the SR node determines in step 304 whether the top segment ID of the stack matches the nodal-segment ID assigned to the SR node. If there is a match, the process proceeds to step 306 where the SR node pops the top segment ID, which may expose an underlying segment ID as the new top segment ID. If there is no new top segment ID (i.e., the segment popped in 306 was the last segment ID of the stack) the packet P has arrived at the egress edge node, and the process ends. If a new top segment ID is exposed, or if there is no match of segment IDs in step 304, the SR node accesses its SR forwarding table in step 314 to read the egress interface that is mapped to the top segment ID. In step 316 the SR node determines whether the top segment ID is an adjacency-segment ID. This determination can be implemented by simply comparing the top segment ID with the designated range of adjacency-segment IDs that are available for assignment within the network. If the top segment ID is found to be within the designated range, the top segment ID is determined to be an adjacency-segment ID and it is popped. In step 322 the SR node forwards packet P and attached stack to the next node via the egress interface identified in step 314.

With continuing reference to FIGS. 3, FIG. 2 shows packet P and attached stack 228 as it is forwarded by nodes. As shown, nodes 204 and 206 forward packet P and stack 228 without popping a segment ID. However, node 208 pops nodal-segment ID 66 and adjacency-segment ID 9003 in accordance with steps 306 and 320, respectively, before the packet P and stack 228 are forwarded to node 216 in accordance with step 322. Nodes 216 and 218 forward packet P and stack 228 without popping segment IDs. SR egress edge node 222 recognizes itself as the last hop of the SP. Eventually, node 222 may employ traditional IP routing and forward packet P to access node AE2 based on routing table lookup using the destination IP address within packet P.

3. Segment Routing Using SR Tunnels

SR networks, such as the network shown in FIG. 2, are capable of transporting many different streams of packets over distinct SPs. Often times, many of these SPs share a common sub path through two or more core SR nodes. For example, two or more distinct streams of packets may flow through nodes 206, 208, 216 and 218 in order to reach egress node 222. PC nodes such as PC nodes 224 and 226 may leverage use of common sub paths to enhance network operation. To illustrate, PC node 226 using collected state and performance information, recognizes the sub path consisting of nodes 206, 208, 216, and 218 is commonly used by several packet flows through the network, and as a result PC node 226 can generate and send an instruction to create an SR tunnel from node 206 to node 218 through which packets flow sequentially through nodes 208 and 216. The instruction received by SR node 206 can list the loopbacks (i.e., loopbacks 65, 66, 70, and 71) that constitute the SR tunnel nodes. Node 206 can create a tunnel segment ID stack corresponding to the SR tunnel. For example, SR node 206 can create a tunnel segment ID stack consisting of nodal-segment IDs 66, 70, and 71. Thereafter, node 206 may generate an FA-segment ID 5500 for the tunnel segment ID list, which is then mapped in memory to the tunnel segment ID stack 66, 70, and 71. Eventually node 206 can advertise the FA-segment ID 5500 bound to the loopbacks of the nodes in the tunnel. The advertisement should list the loopbacks by position within the SR tunnel.

Nodes including PC nodes 224 and 226 receive the FA-segment ID advertisements. The nodes can use information from the FA-segment ID advertisements to create SP paths and corresponding segment ID stacks. To illustrate, edge node 212 may lack a segment ID stack for a particular FEC. Node 212 can generate and send to PC node 224 a path request that identifies the egress node it is trying to reach in addition to other information. PC node 224, using the information in the request as well as network state and performance information, responds by calculating a path that flows in order through nodes 214, 206, 208, 216, and 218. In the illustrated example, an SR tunnel preexists through nodes 206, 208, 216 and 218 as advertised by node 206. Node 212 receives the response from PC node 224 and calculates a segment ID stack for the SP. Or PC node 224 can respond to the request by also calculating the segment ID stack for the path. Either way, the segment ID stack includes FA-segment ID 5500, as opposed to a segment ID stack that includes all nodal-segment IDs for the nodes in the needed SP. In an alternative embodiment, PC node 224 can calculate the needed path and the corresponding segment ID stack without involvement of a PC node. When node 212 receives packets associated with the FEC, node 212 can attach the calculated segment ID stack.

Figure 4:
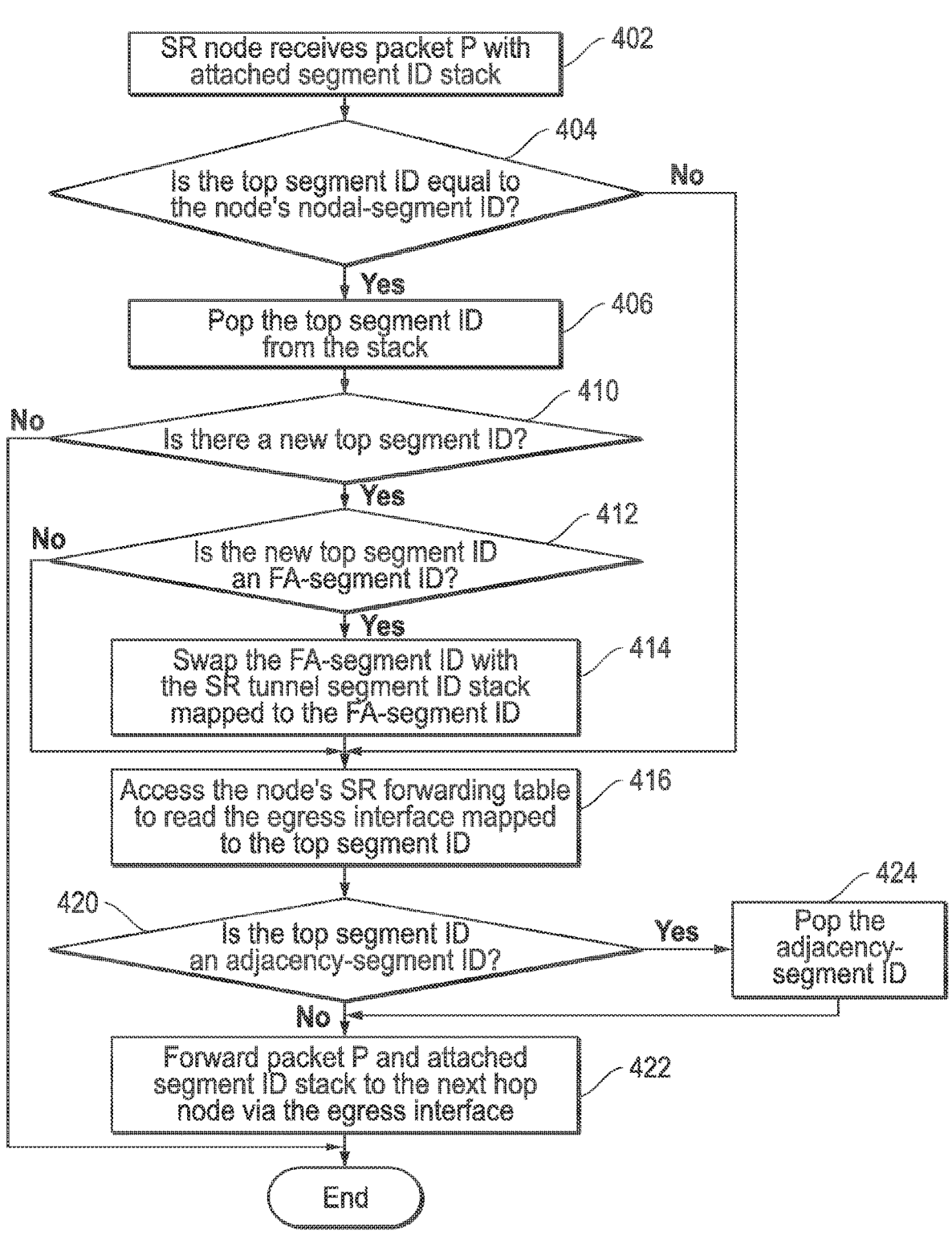
FIG. 4 is a flow chart illustrating an example process employed by a node of FIG. 2.

Nodes within the SP can use the segment IDs, including FA-segment IDs, to forward the packet. FIG. 4 illustrates a process employed by nodes in a network that employs SR tunnels. The process shown in FIG. 4 is substantially similar to the process shown in FIG. 3. A significant difference exists at step 412. In this step, the SR node determines whether the top segment ID is an FA-segment ID. The node can make this determination by comparing the top segment ID with the predefined range for FA-segment IDs. If the top segment ID falls in the range, the top segment ID is determined to be an FA-segment ID. When the new top segment ID is determined to be an FA-segment ID, the node accesses its memory to read the tunnel segment ID stack mapped to the FA-segment ID. Thereafter, the node swaps the top segment ID with the tunnel segment ID stack and the process proceeds to step 416 where the egress interface is identified for the packet and attached segment stack.

Figure 5:
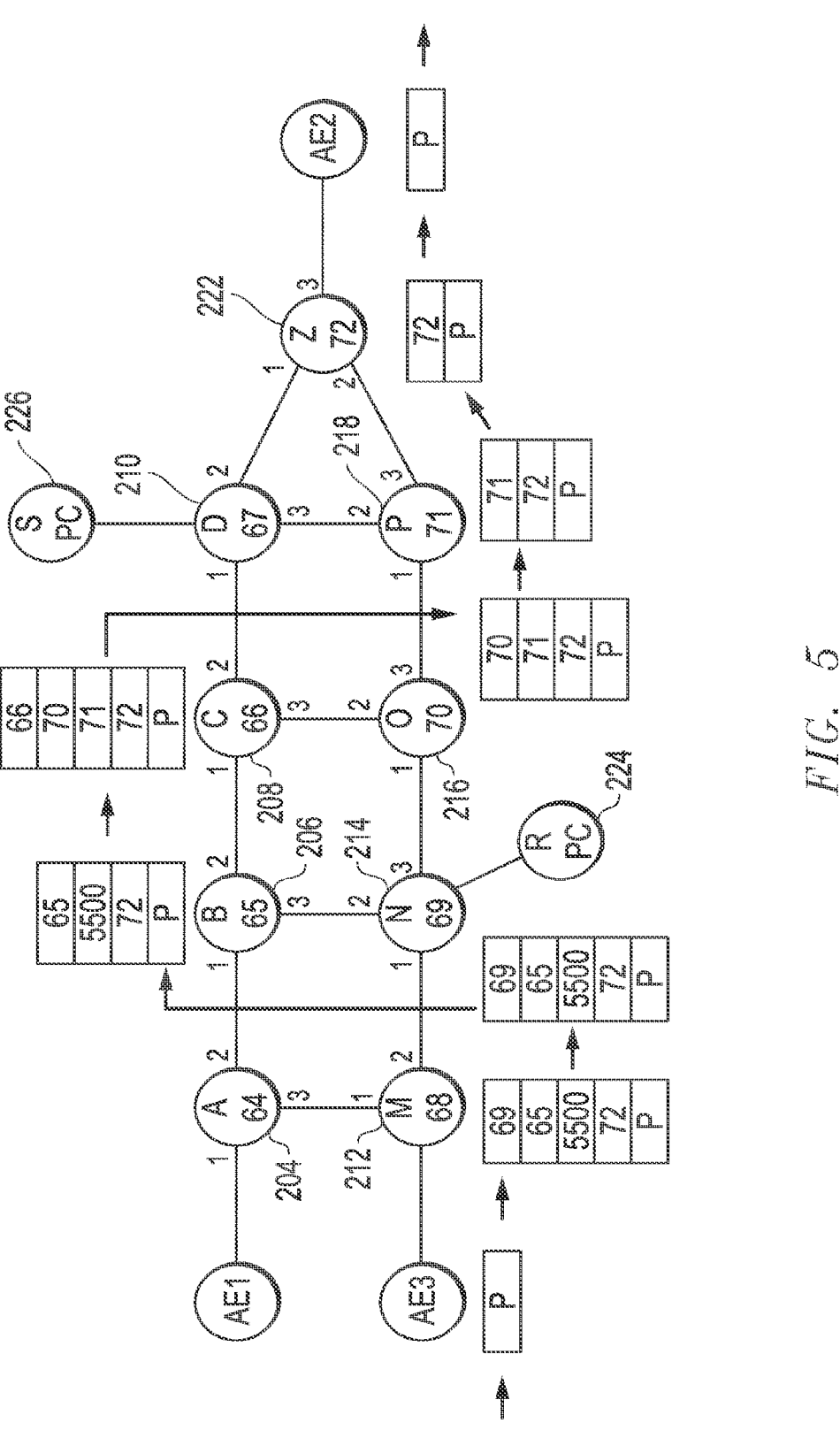
FIG. 5 is a block diagram illustrating certain components of an example network.

FIG. 5 illustrates packet forwarding through the SP that includes the example SR tunnel corresponding to FA-segment ID 5500 in accordance with process shown in FIG. 4. Node 212 attaches the segment ID stack containing FA-segment ID 5500 to packet P. Node 206 receives the packet with attached segment stack from node 214, pops nodal-segment ID 65 in accordance with step 406, and swaps FA-segment ID 5500 with the tunnel segment ID stack consisting of nodal-segment IDs 66, 70, and 71 in accordance with step 414. Node 206 forwards packet P and attached segment stack to node 208 in accordance with step 422.

4. Segment Routing Using TE Tunnels

FIGS. 1, 2, and 5 illustrate example provider networks that contain LDP nodes or SR nodes, but not both. Some providers may employ hybrid networks or networks that contain both LDP and SR nodes. A hybrid network can successfully implement packet transport using TE tunnels extending between SR/LDP head end and tail end nodes. TE tunnels, can be created by head end and tail end SR/LDP nodes in response to receiving a PC node tunnel creation instruction that includes the explicit path definition (i.e., a list of the loopbacks for the nodes constituting the tunnel). Once created, the head end and/or tail end SR/LDP node can associate a FA-segment ID to the TE tunnel.

Figure 6:
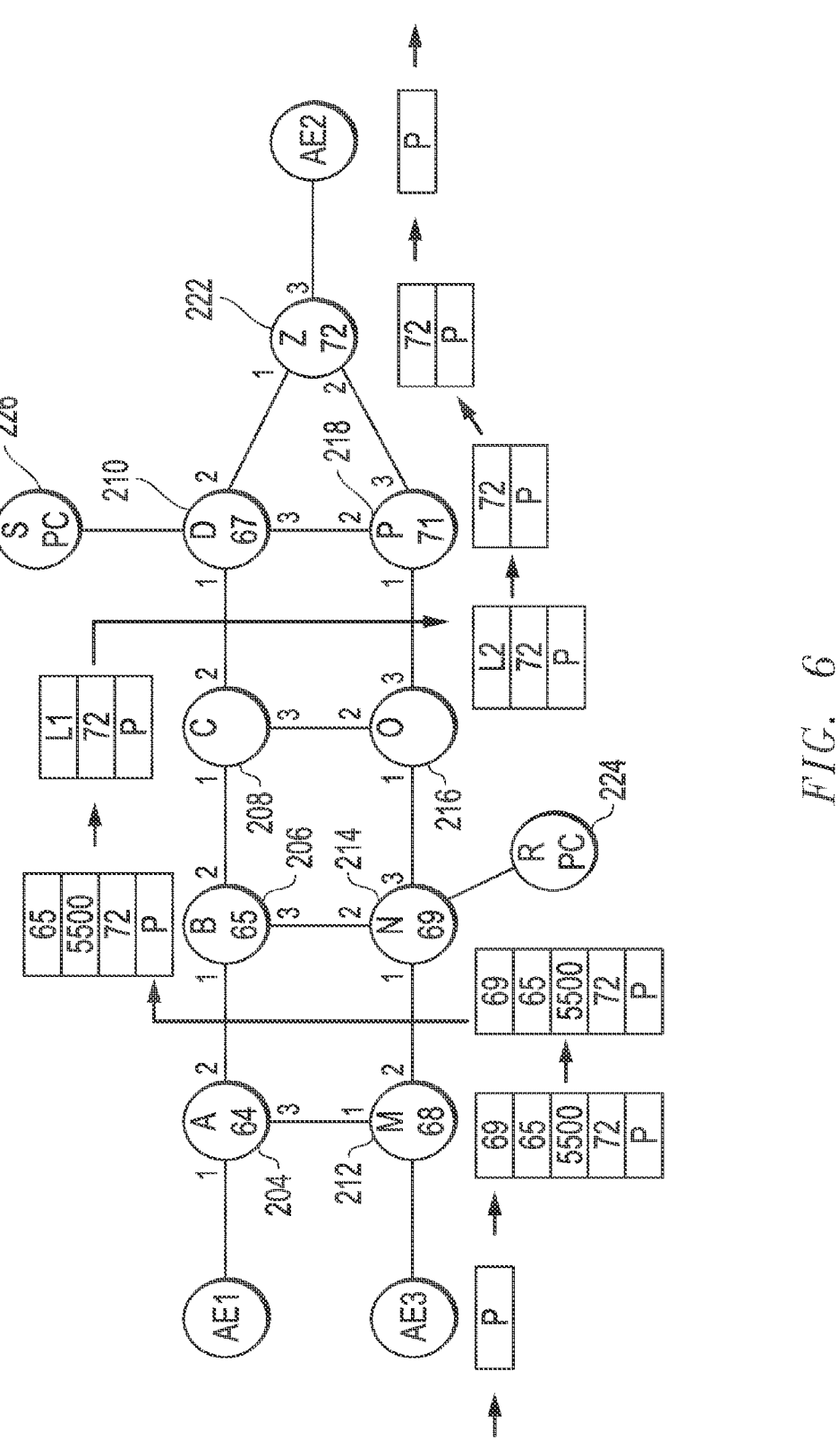
FIG. 6 is a block diagram illustrating certain components of an example network.

FIG. 6 illustrates an example hybrid network that can employ segment routing using TE tunnels. The network is similar to that shown in FIG. 3 and includes SR nodes 204, 210, 212, 214, and 222. Nodes 206 and 218 in this embodiment, however, are both SR and LDP enabled, and nodes 208 and 216 are LDP enabled. The SR/LDP and LDP nodes 206 and 218 can exchange labels using, for example, resource reservation protocol (RSVP) TE signaling during TE tunnel set up.

All SR and SR/LDP nodes are assigned unique nodal-segment IDs. For example, nodes 214, 206, 218, and 222 are assigned nodal-segment IDs 69, 65, 71, and 72, respectively. LDP nodes 208 and 216 are not assigned nodal-segment IDs. Each of the nodes 204-226 is assigned a unique loopback. Loopbacks A-D are assigned to nodes 204-210, respectively, loopbacks M-P are assigned to nodes 212-218 respectively, loopback R is assigned to PC node 224, loopback S is assigned to node 226, and loopback Z is assigned to node 222. These loopbacks are unique in the network and usable to calculate network topology, which in turn can be used to create paths or tunnels, to identify SPTs and next hop egress interfaces for SR forwarding tables, calculate segment ID stacks, etc.

As noted above SR/LDP nodes can create TE tunnels in response to receiving tunnel creation instructions from PC nodes. To illustrate, SR/LDP node 206 may receive an instruction from PC node 226 to create a TE tunnel constituting, in explicit order, nodes 206, 208, 216 and 218. The instruction may define the tunnel in terms of the loopbacks for the nodes constituting the tunnel. Nodes 206, 208, 216 and 218 can employ RSVP-TE messaging to create the tunnel. In this process the nodes may exchange labels. For example, SR/LDP node 206 receives label L1 from LDP node 208, and LDP node 208 receives label L2 from LDP node 216. The labels and egress interfaces are mapped appropriately in LDP forwarding tables. Node 206 generates FA-segment ID 5500 for the example tunnel. Once generated, the head end SR/LDP node 206 can map FA-segment ID 5500 to label L1 in memory. No other node should map label L1 to FA-segment ID 5500. This mapping links label L1 to the TE tunnel in which packets flow in order through nodes 206, 208, 216, and 218.

Each SR and SR/LDP node can advertise routing and performance information to the other nodes in a network, including PC nodes, using IGP and/or BGP with SR extension. For example, node 206 may generate an advertisement that includes FA-segment ID 5500 bound to a list of loopbacks B, C, O, and P for the example TE-tunnel. Edge nodes and/or PC nodes can use the FA-segment ID advertisements to create SPs and corresponding segment ID stacks in much the same manner as described above. For example edge node 212 may lack a segment ID stack for a particular FEC. Node 212 can generate and send to PC node 224 a path request that identifies the egress node for the FEC it is trying to reach in addition to other information. PC node 224, using the information in the request as well as network state and performance information, responds by calculating a path that flows in order through nodes 214, 206, 208, 216, and 218. In the illustrated example, the TE tunnel preexists through nodes 206, 208, 216 and 218 as advertised by node 206, which in turn can be leveraged for more efficient network operation. Node 212 receives the response from PC node 224 and calculates a segment ID stack for the needed SP. Or PC node 224 can respond to the request by also calculating the segment ID stack for the needed SP. Either way, the segment ID stack includes FA-segment ID 5500. In an alternative embodiment, PC node 224 can calculate the needed path and the corresponding segment ID stack without involvement of a PC node. When node 212 receives packets associated with the FEC, node 212 can attach the calculated segment ID stack.

Figure 7:
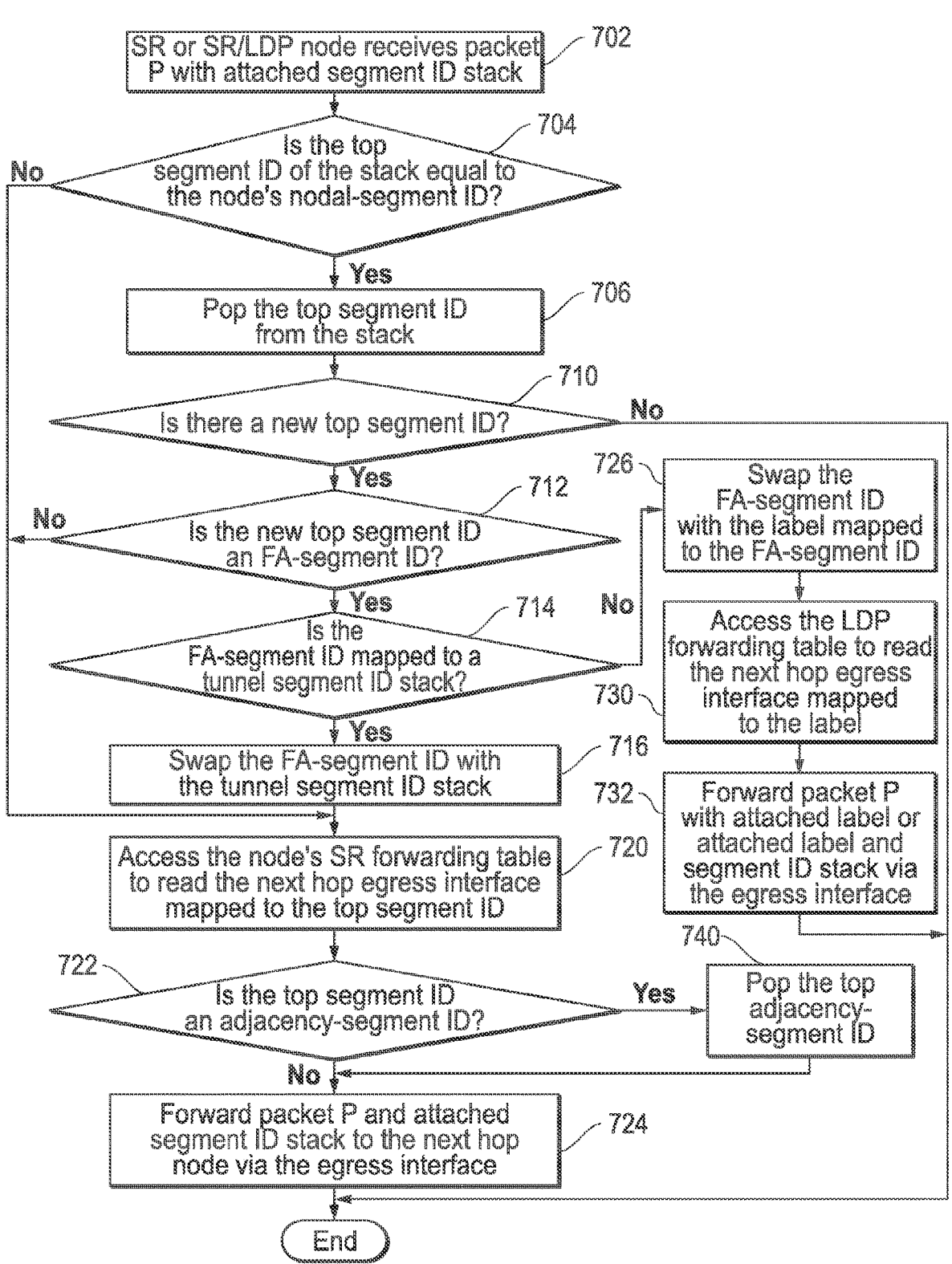
FIG. 7 is a flow chart illustrating an example process employed by a node of FIG. 6.

FIG. 7 illustrates an example forwarding process employed within nodes of a network such as that shown in FIG. 6. The process shown in FIG. 7 is similar to the process shown in FIG. 4. However, significant differences exist. More particularly, as shown in FIG. 7 if the top segment ID is determined to be an FA-segment ID in step 712, the node that receives the packet P determines whether the FA-segment ID is mapped to a tunnel segment ID stack or a label. If it is mapped to a tunnel segment ID stack, the process proceeds to step 716 where the node swaps the FA-segment ID with the SR tunnel segment ID stack mapped to the FA-segment ID. However, if it is determined the FA-segment ID is not mapped to a tunnel segment ID stack, the process proceeds to step 726 where the SR/LDP node swaps the FA-segment ID with the label mapped in memory to the FA-segment ID. Thereafter, the node accesses its LDP forwarding table to read the next hop egress interface mapped to the label. The node then forwards the packet P with the attached label or attached label and segment ID stack via the egress interface identified in step 730. Although not shown in FIG. 7, the tail end SR/LDP node will receive the packet P with a segment list attached to it, and the tail end SR/LDP node will process or forward the packet in accordance with the process shown within FIG. 3 after the penultimate node in the TE tunnel pops the label and forwards the packet to the SR/LDP tail end.

FIG. 6 illustrates packet forwarding through the hybrid network that includes the example TE tunnel corresponding to FA-segment ID 5500 in accordance with process shown in FIG. 7. Node 212 attaches the segment ID stack containing FA-segment ID 5500 to packet P. Node 206 receives the packet with attached segment stack from node 214, pops nodal-segment ID 65 in accordance with step 406, and swaps FA-segment ID 5500 with label L1 in accordance with step 726. Node 206 forwards packet P and attached label and segment stack to node 208 in accordance with step 732.

Figure 8:
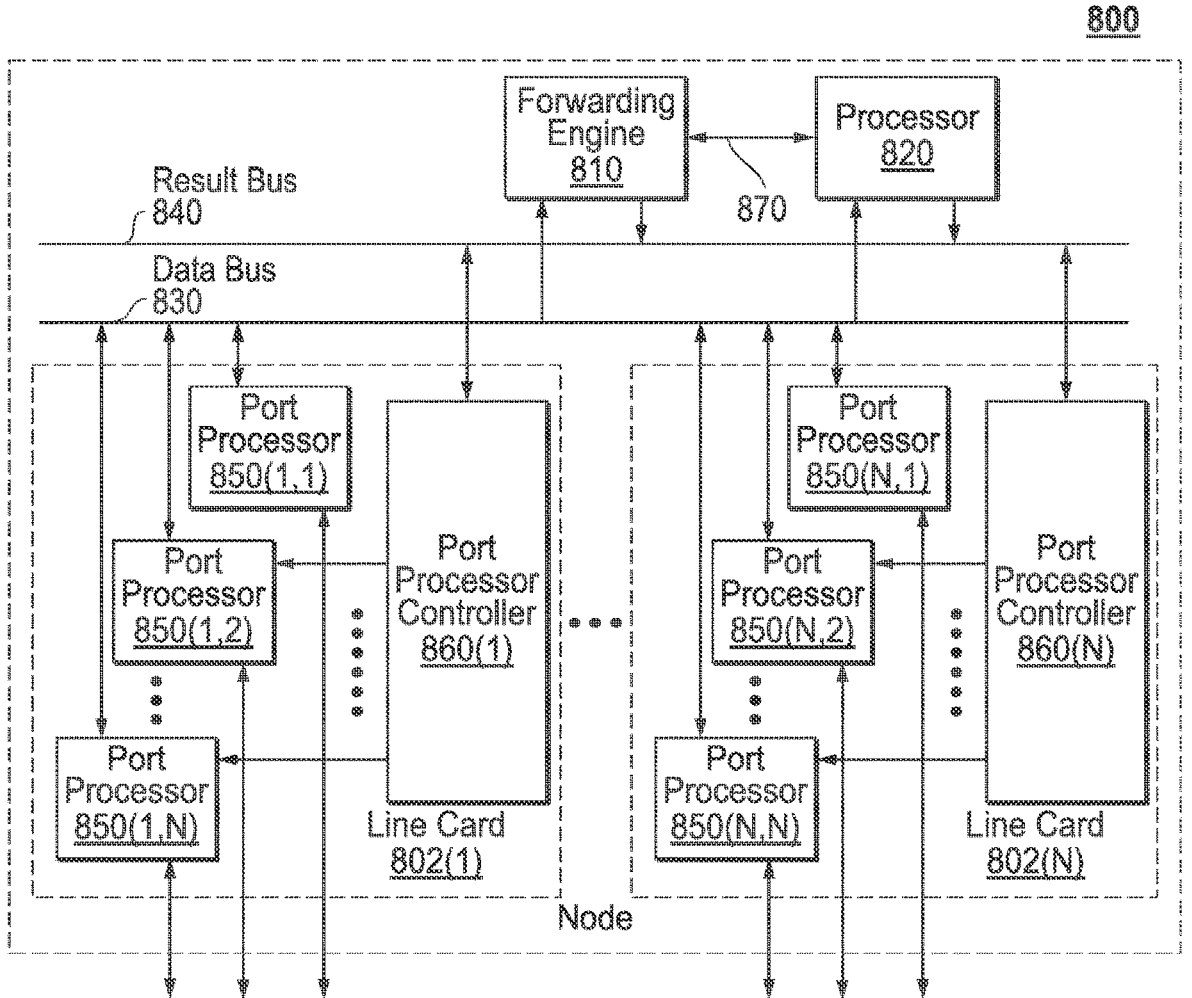
FIG. 8 is a block diagram illustrating certain components of an example node that can be employed in the network of FIG. 1, 2, 5 or 6.

FIG. 8 is a block diagram illustrating certain additional and/or alternative components of nodes that can be employed in the networks shown in FIG. 1, 2, 5, or 6. In this depiction, node 800 includes a number of line cards (line cards 802(1)-(N)) that are communicatively coupled to a forwarding engine or packet forwarder 810 and a processor 820 via a data bus 830 and a result bus 840. Line cards 802(1)-(N) include a number of port processors 850(1,1)-(N,N) which are controlled by port processor controllers 860(1)-(N). It will also be noted that forwarding engine 810 and processor 820 are not only coupled to one another via data bus 830 and result bus 840, but are also communicatively coupled to one another by a communications link 870.

The processors 850 and 860 of each line card 802 may be mounted on a single printed circuit board. When a packet or packet and header are received, the packet or packet and header may be identified and analyzed by router 800 in the following manner. Upon receipt, a packet (or some or all of its control information) or packet and header is sent from the one of port processors 850(1,1)-(N,N) at which the packet or packet and header was received to one or more of those devices coupled to data bus 830 (e.g., others of port processors 650(1,1)-(N,N), forwarding engine 810 and/or processor 820). Handling of the packet or packet and header can be determined, for example, by forwarding engine 810. For example, forwarding engine 810 may determine that the packet or packet and header should be forwarded to one or more of port processors 850(1,1)-(N,N). This can be accomplished by indicating to corresponding one(s) of port processor controllers 860(1)-(N) that the copy of the packet or packet and header held in the given one(s) of port processors 850(1,1)-(N,N) should be forwarded to the appropriate one of port processors 850(1,1)-(N,N). In addition, or alternatively, once a packet or packet and header has been identified for processing, forwarding engine 810, processor 820 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:

receiving, at a routing node, a packet, the packet including a first segment identifier (ID) stack, wherein the first segment ID stack comprises one or more segment identifiers, the one or more segment identifiers including an active segment identifier;

responsive to the active segment identifier being a nodal segment identifier of the routing node, popping the active segment identifier from the first segment ID stack to create a modified segment ID stack and to advance the active segment identifier to a next segment identifier in the first segment ID stack;

responsive to the active segment identifier being a forwarding adjacency segment identifier:

accessing a memory to identify a second segment ID stack associated with the forwarding adjacency segment identifier, the second segment ID stack mapped in the memory to the forwarding adjacency segment identifier, the second segment ID stack comprising a plurality of segment identifiers that collectively define a sub-path among a plurality of sub-paths of a segment path in a network, each segment identifier of the plurality of segment identifiers corresponding to a node in the sub-path; and modifying the first segment ID stack by swapping the forwarding adjacency segment identifier with the plurality of segment identifiers in the second segment ID stack to produce the modified segment ID stack; and forwarding the packet based on the modified segment ID stack, the forwarding the packet comprises:

accessing the memory to identify an egress interface of the routing node mapped to the active segment identifier of the modified segment ID stack;

responsive to the active segment identifier being an adjacency segment identifier, popping the active segment identifier from the modified segment ID stack; and forwarding the packet from the identified egress interface.

2. The method of claim 1, further comprising:

receiving the second segment ID stack and the forwarding adjacency segment identifier from a remote controller; and storing the second segment ID stack and the forwarding adjacency segment identifier in the memory.

3. The method of claim 1, wherein the packet comprises a pointer indicating the active segment identifier of the first segment ID stack, wherein popping the active segment identifier comprises advancing, by the routing node, the pointer to a next segment identifier in the first segment ID stack.

4. The method of claim 1, wherein a second segment identifier in the first segment ID stack is a nodal segment identifier.

5. The method of claim 1, wherein a second segment identifier in the first segment ID stack is an adjacency segment identifier.

6. The method of claim 1, wherein the forwarding adjacency segment identifier corresponds to a segment routing tunnel in the network.

7. The method of claim 1, wherein the second segment ID stack is identified in a single lookup operation based on the forwarding adjacency segment identifier.

8. A network device, comprising:

a plurality of interfaces operative to transmit and receive packets over a network; and one or more processors operative to:

receive, at an ingress interface of the plurality of interfaces, a packet, the packet including a first segment identifier (ID) stack, wherein the first segment ID stack comprises one or more segment identifiers, the one or more segment identifiers including an active segment identifier;

responsive to the active segment identifier being a nodal segment identifier of the network device, pop the active segment identifier from the first segment ID stack to create a modified segment ID stack and to advance the active segment identifier to a next segment identifier in the first segment ID stack;

responsive to the active segment identifier being a forwarding adjacency segment identifier:

access a memory to identify a second segment ID stack associated with the forwarding adjacency segment identifier, the second segment ID stack mapped in the memory to the forwarding adjacency segment identifier, the second segment ID stack comprising a plurality of segment identifiers that collectively define a sub-path among a plurality of sub-paths of a segment path in a network, each segment identifier of the plurality of segment identifiers corresponding to a node in the sub-path; and modify the first segment ID stack by swapping the forwarding adjacency segment identifier with the plurality of segment identifiers in the second segment ID stack to produce the modified segment ID stack; and forward the packet based on the modified segment ID stack, wherein at least one of the one or more processors is operative to forward the packet by:

accessing the memory to identify an egress interface of the network device mapped to the active segment identifier of the modified segment ID stack;

responsive to the active segment identifier being an adjacency segment identifier, popping the active segment identifier from the modified segment ID stack; and forwarding the packet from the identified egress interface.

9. The network device of claim 8, wherein at least one of the one or more processors is operative to:

receive the second segment ID stack and the forwarding adjacency segment identifier from a remote controller; and store the second segment ID stack and the forwarding adjacency segment identifier in the memory.

10. The network device of claim 8, wherein the packet comprises a pointer indicating the active segment identifier of the first segment ID stack, wherein at least one of the one or more processors are further operative to:

pop the active segment identifier by advancing the pointer to a next segment identifier in the first segment ID stack.

11. The network device of claim 8, wherein a second segment identifier in the first segment ID stack is a nodal segment identifier.

12. The network device of claim 8, wherein a second segment identifier in the first segment ID stack is an adjacency segment identifier.

13. The network device of claim 8, wherein the forwarding adjacency segment identifier corresponds to a segment routing tunnel in the network.

14. The network device of claim 8, wherein the second segment ID stack is identified in a single lookup operation based on the forwarding adjacency segment identifier.

* * * * *